(12) United States Patent
Waatti et al.

(10) Patent No.: US 10,471,671 B2
(45) Date of Patent: Nov. 12, 2019

(54) THREE-DIMENSIONAL PRINTING ALONG A CURVED SURFACE

(71) Applicant: NIKE, Inc., Beaverton, OR (US)

(72) Inventors: Todd A. Waatti, Battleground, WA (US); Yoav Sterman, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 648 days.

(21) Appl. No.: 14/935,977

(22) Filed: Nov. 9, 2015

(65) Prior Publication Data

US 2017/0129172 A1    May 11, 2017

(51) Int. Cl.
| | |
|---|---|
| *B29D 35/12* | (2010.01) |
| *B29D 35/02* | (2010.01) |
| *B29C 64/106* | (2017.01) |
| *B29C 64/112* | (2017.01) |
| *B29C 64/20* | (2017.01) |
| *A43B 9/00* | (2006.01) |
| *A43B 13/22* | (2006.01) |
| *B29C 48/155* | (2019.01) |
| *B33Y 10/00* | (2015.01) |
| *B33Y 30/00* | (2015.01) |
| *B33Y 80/00* | (2015.01) |

(Continued)

(52) U.S. Cl.
CPC .............. *B29D 35/122* (2013.01); *A43B 9/00* (2013.01); *A43B 13/223* (2013.01); *B29C 48/155* (2019.02); *B29C 64/106* (2017.08); *B29C 64/112* (2017.08); *B29C 64/20* (2017.08); *B29D 35/02* (2013.01); *B29C 48/02* (2019.02); *B29C 48/05* (2019.02); *B29C 48/266* (2019.02); *B33Y 10/00* (2014.12); *B33Y 30/00* (2014.12); *B33Y 80/00* (2014.12)

(58) Field of Classification Search
CPC .................................................... B29D 35/122
See application file for complete search history.

(56) References Cited

U.S. PATENT DOCUMENTS

| | | |
|---|---|---|
| 4,098,632 A | 7/1978 | Sprague, Jr. |
| 4,643,864 A | 2/1987 | Martini |

(Continued)

FOREIGN PATENT DOCUMENTS

EP            338617 A1     10/1989

OTHER PUBLICATIONS

International Search Report and Written Opinion for related International Application No. PCT/US2016/052911, 13 pages, dated Jan. 5, 2017.

(Continued)

*Primary Examiner* — Larry W Thrower
(74) *Attorney, Agent, or Firm* — Klarquist Sparkman, LLP

(57) ABSTRACT

A method and apparatus for printing onto a curved surface of an article are disclosed. An embodiment of a method may include receiving the article and extruding a composite yarn from a nozzle. A method may include attaching the composite yarn to the curved surface by moving the nozzle in a direction aligned with a first axis and a direction aligned with second axis along the curved surface. The first axis may be approximately normal to the print surface and the second axis may be approximately normal to the first direction. The article may be repositioned during printing to accommodate nozzle movement.

21 Claims, 13 Drawing Sheets

(51) Int. Cl.
  *B29C 48/02* (2019.01)
  *B29C 48/05* (2019.01)
  *B29C 48/25* (2019.01)

(56) References Cited

U.S. PATENT DOCUMENTS

| | | |
|---|---|---|
| 6,464,907 B2 | 10/2002 | Gross |
| 2007/0170610 A1* | 7/2007 | Payne .................... D04H 1/495 264/13 |
| 2009/0140470 A1 | 6/2009 | Dua et al. |
| 2014/0020192 A1 | 1/2014 | Jones et al. |
| 2015/0021832 A1 | 1/2015 | Yerazunis et al. |
| 2015/0182811 A1 | 7/2015 | Bender |
| 2015/0251360 A1* | 9/2015 | Steele .................... B33Y 10/00 264/308 |

OTHER PUBLICATIONS

"Fibre Core" from RepRapWiki, printed on May 5, 2014 from http://reprap.org/wiki/Fibre_Core, (5 pages).

"Pultrusion" from Wikipedia, printed on May 5, 2014 from http://en.wikipedia.org/wiki/Pultrusion, (5 pages).

Office Action from the Taiwan Intellectual Property Office for related Taiwanese Application No. 105136242, dated Nov. 15, 2017, 18 pages (w/ English translation).

\* cited by examiner

THREE-DIMENSIONAL PRINTING ALONG A CURVED SURFACE

BACKGROUND

The present embodiments relate generally to three-dimensional printing systems and methods.

Three-dimensional printing systems and methods may be associated with various technologies including fused deposition modeling (FDM), electron beam freeform fabrication (EBF), and selective laser sintering (SLS), as well as other kinds of three-dimensional printing technologies.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
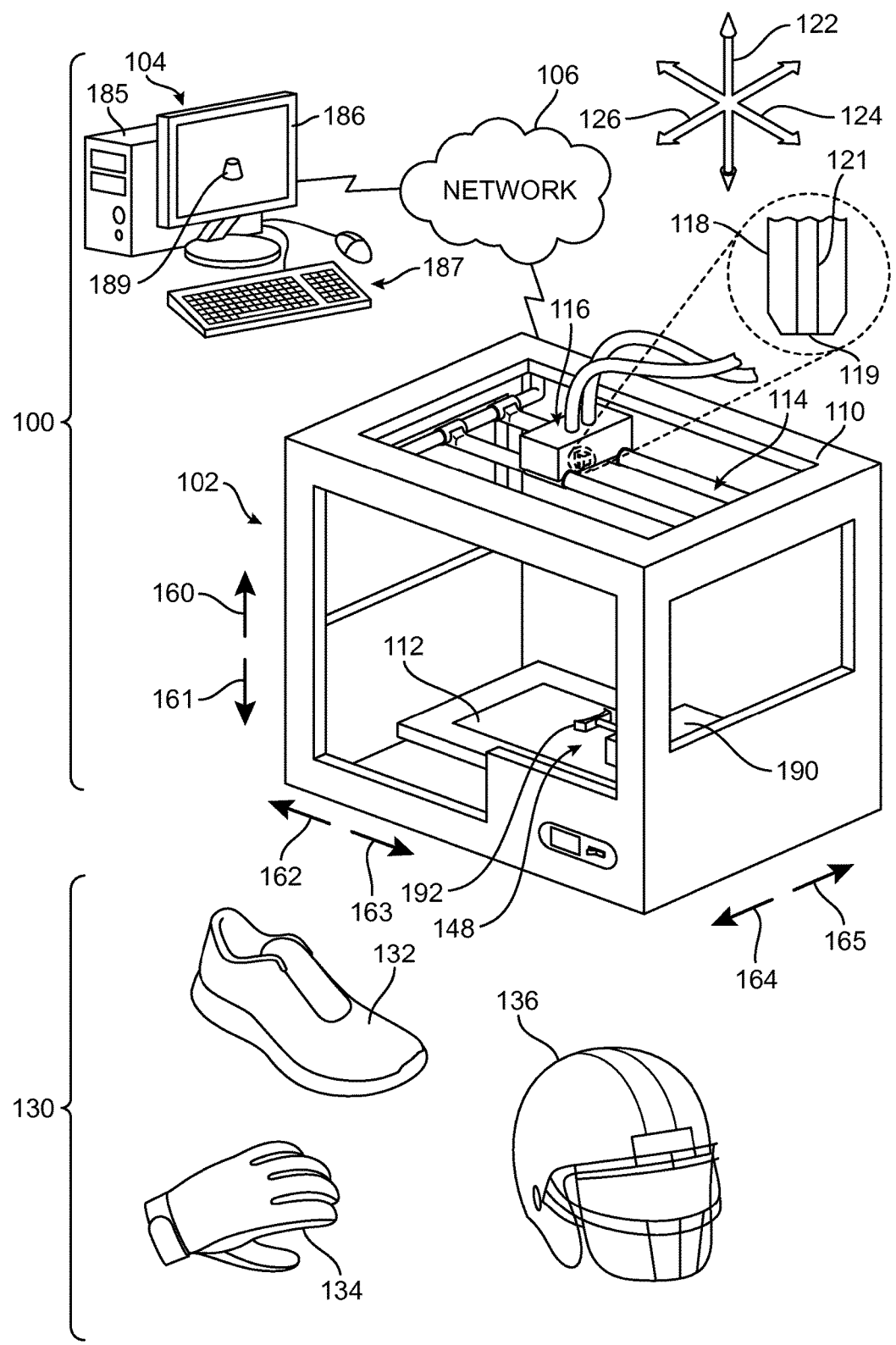
FIG. 1 is a schematic view of an embodiment of components of a three-dimensional printing system as well as several articles that may be used with the three-dimensional printing system.

In one embodiment, a method of printing on a curved surface may comprise positioning an article in a first position on an upper surface of a base of the printing system. The upper surface of the base defines a vertical axis that is perpendicular to the upper surface of the base and the upper surface of the base defines a first horizontal axis that is parallel to the upper surface of the base and that is perpendicular to the vertical axis. The method may further include discharging a print material, such as a composite yarn, from a nozzle. The print surface may include at least one curved area. By moving the nozzle in a direction aligned with the vertical axis over the print surface and simultaneously moving the nozzle in a direction aligned with the first horizontal axis over the print surface, the print material can be attached to a print surface of the article using a print system. The nozzle is spaced at a print distance from the print surface while attaching the print material to the print surface.

In another embodiment, a method of printing a three-dimensional structure on a curved surface of an article may comprise placing the article on a base of a printing system, discharging a continuous composite yarn from a nozzle of the printing system, and attaching the continuous composite yarn to the curved surface of the article to form a first portion of a first printed layer on the curved surface. The method further comprises forming the first printed layer, the first printed layer having an outer surface that is exposed, attaching the continuous composite yarn to at least a portion of the outer surface of the first printed layer and forming at least a second printed layer, and forming a three-dimensional first structure on the curved surface.

In another embodiment, an apparatus for printing onto a curved surface of an article may comprise a housing, where the housing includes a base disposed along the bottom of the housing, and a nozzle configured to discharge a composite yarn onto the curved surface. The apparatus may also include a first actuating system configured to move the nozzle, where the first actuating system can move the nozzle along a direction aligned with a first vertical axis, the first vertical axis extending normal to a surface of the base, and where the first actuating system can move the nozzle along a direction aligned with a first horizontal axis, the first horizontal axis being approximately parallel with respect to the base. The apparatus is configured to attach the composite yarn to the curved surface by moving the nozzle downward toward the curved surface in a direction aligned with the first vertical axis, and the apparatus is also configured to attach the composite yarn to the curved surface by moving the nozzle in a direction aligned with the first horizontal axis.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

FIG. 1 is a schematic view of an embodiment of a three-dimensional printing system 100, also referred to simply as printing system 100 hereafter. FIG. 1 also illustrates several exemplary articles 130 that may be used with printing system 100. Referring to FIG. 1, printing system 100 may further comprise a printing device 102, a computing system 104, and a network 106.

Embodiments may use various kinds of three-dimensional printing (or additive manufacturing) techniques. Three-dimensional printing, or "3D printing," comprises various technologies that are used to form three-dimensional objects by depositing successive layers of material on top of one another. Exemplary 3D printing technologies that could be used include, but are not limited to: fused filament fabrication (FFF), electron beam freeform fabrication (EBF), direct metal laser sintering (DMLS), electron beam melting (EMB), selective laser melting (SLM), selective heat sintering (SHS), selective laser sintering (SLS), plaster-based 3D printing (PP), laminated object manufacturing (LOM), stereolithography (SLA), and digital light processing (DLP), as well as various other kinds of 3D printing or additive manufacturing technologies known in the art.

For consistency and convenience, directional adjectives are employed throughout this detailed description corresponding to the illustrated embodiments. The term "longitudinal axis," as used throughout this detailed description and in the claims, refers to an axis extending a length of a component. Thus, a "longitudinal direction," as used throughout this detailed description and in the claims, refers to a direction aligned with a longitudinal axis.

The term "lateral axis," as used throughout this detailed description and in the claims, refers to a side-to-side axis extending a width of a component. For example, the lateral axis may extend between a medial side and a lateral side of an article of footwear, with the lateral side of the article of footwear being the surface that faces away from the other foot, and the medial side being the surface that faces toward the other foot. Thus, a "lateral direction," as used throughout this detailed description and in the claims, refers to a direction aligned with a lateral axis.

The term "horizontal," as used throughout this detailed description and in the claims, refers to any direction or axis that is substantially parallel with the longitudinal axis, the lateral axis, and all directions in between. In cases where a component is placed on the ground, a horizontal axis may be parallel with the ground.

The term "vertical," as used throughout this detailed description and in the claims, refers to an axis that is generally perpendicular to both the lateral and longitudinal axes, along a substantially vertically (upward and downward) oriented axis. For example, in cases where a component is flat on a ground surface, the vertical axis may extend from the ground surface upward.

It will be understood that each of these directional adjectives may be applied to individual components of a sole. Furthermore, the term "outer surface" as used throughout this detailed description and in the claims, refers to the surface of a component that is exposed or facing the external environment.

For purposes of this disclosure, the foregoing directional terms, when used in reference to a printing system or an article of footwear or other article of apparel, shall refer to the articles when disposed on a substantially flat surface. With respect to an article of footwear, the directional terms refer to the article when sitting in an upright position, with the sole facing groundward, that is, as it would be positioned when worn by a wearer standing on a substantially level surface.

In the embodiments shown in the figures, printing system 100 may be associated with fused filament fabrication (FFF), also referred to as fused deposition modeling. In the embodiment shown in FIG. 1, printing device 102 of printing system 100 may use fused filament fabrication to produce three-dimensional parts. An example of a printing device using fused filament fabrication (FFF) is disclosed in U.S. Pat. No. 5,121,329 to Crump, issued Jun. 9, 1992, and titled "Apparatus and Method for Creating Three-Dimensional Objects," which application is herein incorporated by reference and referred to hereafter as the "3D Objects application." Embodiments of the present disclosure can make use of any of the systems, components, devices, and methods disclosed in the 3D Objects application.

Printing device 102 may include a housing 110 that supports various systems, devices, components, or other provisions that facilitate the three-dimensional printing of objects (e.g., parts, components, or structures). Although the exemplary embodiment depicts a particular rectangular box-like geometry for housing 110, other embodiments could use any housing having any geometry and/or design. The shape and size of housing 110 could be varied according to factors including a desired footprint for the device, the size and shape of parts that may be formed within printing device 102, as well as possibly other factors. It will be understood that housing 110 could be open (e.g., provide a frame with large openings) or closed (e.g., with glass or panels of solid material and a door).

In some embodiments, printing device 102 may include provisions to retain or hold a printed object (or a component supporting the printed object). In some embodiments, printing device 102 may include a table, base, platform, tray, or similar component to support, retain, and/or hold a printed object or an object onto which printed material is applied. In the embodiment of FIG. 1, printing device 102 includes a surface that will be referred to as a base 112. In some embodiments, base 112 may be fixed in place and act as a stable base. In other embodiments, however, base 112 could move. For example, in some cases, base 112 may be configured to translate within housing 110 in various horizontal directions (e.g., front-back and/or left right with respect to housing 110) as well as vertical directions (e.g., up-down within housing 110). Moreover, in some cases, base 112 may be configured to rotate and/or tilt about one or more axes associated with base 112. Thus, it is contemplated that in at least some embodiments, base 112 may be moved into any desired relative configuration with a nozzle or print head of printing device 102. In other embodiments, printing device 102 may not include a base 112. In some embodiments, base 112 may be curved, irregularly shaped, or shaped to provide a customized platform upon which an article or object may be placed or secured. However, in other embodiments, base 112 may comprise a substantially flat surface. In some embodiments, printing device 102 may include an open space or cavity formed within base 112.

In some embodiments, printing device 102 may include one or more systems, devices, assemblies, or components for delivering a printed material (or printed substance) to a target location. Target locations could include the surface of base 112, a surface or portion of a partially printed structure, and/or a surface or portion of a non-printed structure or component. Provisions for delivering printed materials may include, for example, print heads and nozzles. In the embodiment of FIG. 1, printing device 102 includes a nozzle assembly 116.

Nozzle assembly 116 may comprise one or more nozzles that deliver a printed material to a target location. For purposes of clarity, the exemplary embodiment of FIG. 1 depicts a single nozzle 118 of nozzle assembly 116. However, in other embodiments, nozzle assembly 116 could be configured with any number of nozzles, which could be arranged in an array or any particular configuration. In embodiments comprising two or more nozzles, the nozzles could be configured to move together and/or independently.

Nozzle 118 may be configured with a nozzle aperture 119 that can be opened and/or closed to control the flow of material exiting from nozzle 118. Specifically, nozzle aperture 119 may be in fluid communication with a nozzle channel 121 that receives a supply of material from a material source (not shown) within printing device 102. Some examples of materials that may be received or used are disclosed in U.S. Pat. No. 9,889,606, which application is herein incorporated by reference in its entirety, hereinafter referred to as the "Tack and Drag case."

In some embodiments, a worm-drive may be used to push the filament into nozzle 118 at a specific rate (which may be varied to achieve a desired volumetric flow rate of material from nozzle 118). In other embodiments, a worm-drive is omitted. For example, the material may be pulled from nozzle 118 using an actuating system. It will be understood that in some cases, the supply of material could be provided at a location near nozzle 118 (e.g., in a portion of nozzle assembly 116), while in other embodiments the supply of material could be located at some other location of printing device 102 and fed via tubes, conduits, or other provisions, to nozzle assembly 116.

As will be described below, printing system 100 can include provisions for facilitating the alignment of a printed design or graphic onto an article. In some embodiments, it may be useful to provide a user with a way of aligning an article with printing system 100 so as to ensure a graphic is printed in the desired portion of the article. In particular, printing system 100 may include provisions for programming the orientation of an article with print device 102 in such a way as to accommodate articles of various types, shapes, curves, and sizes.

In some embodiments, nozzle assembly 116 is associated with a first actuating system 114. First actuating system 114 may include various components, devices, and systems that facilitate the motion of nozzle assembly 116 within housing 110. In particular, first actuating system 114 may include provisions to move nozzle assembly 116 in any horizontal direction (including but not limited to directions aligned with a longitudinal axis 124 and directions aligned with a lateral axis 126) and/or directions aligned with a vertical axis 122 to facilitate depositing a material so as to form a three-dimensional object or to print along a three-dimensional or curved surface. To this end, embodiments of first actuating system 114 may include one or more tracks, rails, and/or similar provisions to hold nozzle assembly 116 at various positions and/or orientations within housing 110. Embodiments may also include any kinds of motors, such as a stepper motor or a servo motor, to move nozzle assembly 116 along a track or rail, and/or to move one or more tracks or rails relative to one another.

For purposes of this description, an object or article with a curved surface refers to articles with one or more portions that include curves, bumps, and varying regions of thickness, such as articles 130 of FIG. 1. For example, an article may have regions that are flat, smooth, level, or even, with relatively little thickness. However, the same article may also include curved regions with surfaces that deviate from being straight for some or all of its length or area. In some embodiments, a curved surface or curved area identifies a portion of an article that increases and/or decreases in height or thickness associated with the vertical axis of the article. In some embodiments, curved surfaces can comprise regular, geometric curves such as those associated with circles, triangles, squares, and other geometric shapes, and/or they may also be irregular, for example in articles shaped to accommodate or include a particular uneven configuration.

An actuating system can be configured to move a nozzle in one or more directions. In some embodiments, an actuating system could move a nozzle in a single linear direction. In other embodiments, an actuating system could move a nozzle in at least two perpendicular directions. In still other embodiments, an actuating system could move a nozzle in three perpendicular directions. For example, in the exemplary embodiment shown in FIG. 1, first actuating system 114 may be configured to move nozzle 118 in a first direction 160 (here, similar to an upward direction), a second direction 161 (here, similar to a downward direction), a third direction 162, a fourth direction 163, a fifth direction 164, and a sixth direction 165. As seen in FIG. 1, in some embodiments, first direction 160 and second direction 161 may be aligned with vertical axis 122, and may generally represent opposing directions. Furthermore, third direction 162 and fourth direction 163 may be aligned with longitudinal axis 124 in some embodiments, and may generally represent opposing directions. In addition, fifth direction 164 and sixth direction 165 can be aligned with lateral axis 126 in some embodiments, and may generally represent opposing directions. Thus, third direction 162, fourth direction 163, fifth direction 164, and sixth direction 165 can represent generally horizontally oriented directions (e.g., length and width directions), while first direction 160 and second direction 161 can represent vertically oriented directions (e.g., height directions). Of course, while the exemplary embodiment depicts an actuating system capable of moving a nozzle through three independent x-y-z or Cartesian directions, other embodiments may be configured to move a nozzle in six independent directions associated with a non-Cartesian coordinate system (e.g., a spherical coordinate system or a cylindrical coordinate system). Still further, in other cases an actuating system could move a nozzle through six or more different directions that may not be orthogonal (e.g., directions of an oblique coordinate system).

In some embodiments, first direction 160 and/or second direction 161 may be at a non-zero angle relative to a surface, such as base 112 or print surface 148. For example, in FIG. 2, first direction 160 and second direction 161 are approximately normal to base 112. As used herein, a direction is approximately normal to a surface when it is within 10 degrees from perpendicular to the surface. Thus, in different embodiments, first direction 160, second direction 161, and/or nozzle 118 may be at a non-zero angle relative to print surface 148 and/or base 112.

For purposes of this discussion, a print surface may be associated with the surface where a nozzle is printing. For purposes of this disclosure, print surface 148 refers to the surface of an article that receives or is attached to a printing material such as a composite yarn or other material extruded or otherwise discharged or emitted from nozzle 118 during printing. For example, in cases where nozzle 118 prints directly onto base 112, the print surface is associated with or comprises a surface of base 112. In the embodiment of FIG. 1, print surface 148 is illustrated as the side of base 112 that faces upward toward nozzle assembly 116. However, it should be noted that in other embodiments, print surface 148 may comprise the surface or side of an article or object that is printed upon by nozzle 118. Print surface 148 may be generally flat, or it may be substantially curved and include contours. In one embodiment, print surface 148 may be the side or surface of an object or article that is generally normal relative to vertical axis 122. However, in other embodiments, for example in cases where the article is non-flat, print surface 148 may not be normal relative to vertical axis 122.

In certain embodiments, printing system 100 can selectively move nozzle 118. In one embodiment, printing system 100 simultaneously moves nozzle 118 in directions aligned with three different axes, as noted above. In one example, printing system 100 may move nozzle 118 in first direction 160 away from base 112, while simultaneously moving nozzle 118 in third direction 162 and/or in fifth direction 164 over print surface 148. In another example, a position along a direction is maintained while printing system 100 selectively moves nozzle 118 in another direction. Printing system 100 may move nozzle 118 in second direction 161 toward print surface 148 while simultaneously maintaining a base position of nozzle 118 along longitudinal axis 124 and lateral axis 122 over print surface 148. For example, printing system 100 may move nozzle 118 in first direction 160 away from base 112 while simultaneously maintaining a base position of nozzle 118 in third direction 162, fourth direction 163, fifth direction 164, and sixth direction 165 (i.e., remaining stationary with respect to those directions). In another example, printing system 100 may maintain a print distance 216 (see FIG. 2) from nozzle 118 with respect to vertical axis 122 while simultaneously moving nozzle 118 parallel to print surface 148 in a horizontal direction (e.g., third direction 162, fourth direction 163, fifth direction 164, and sixth direction 165).

Figure 2:
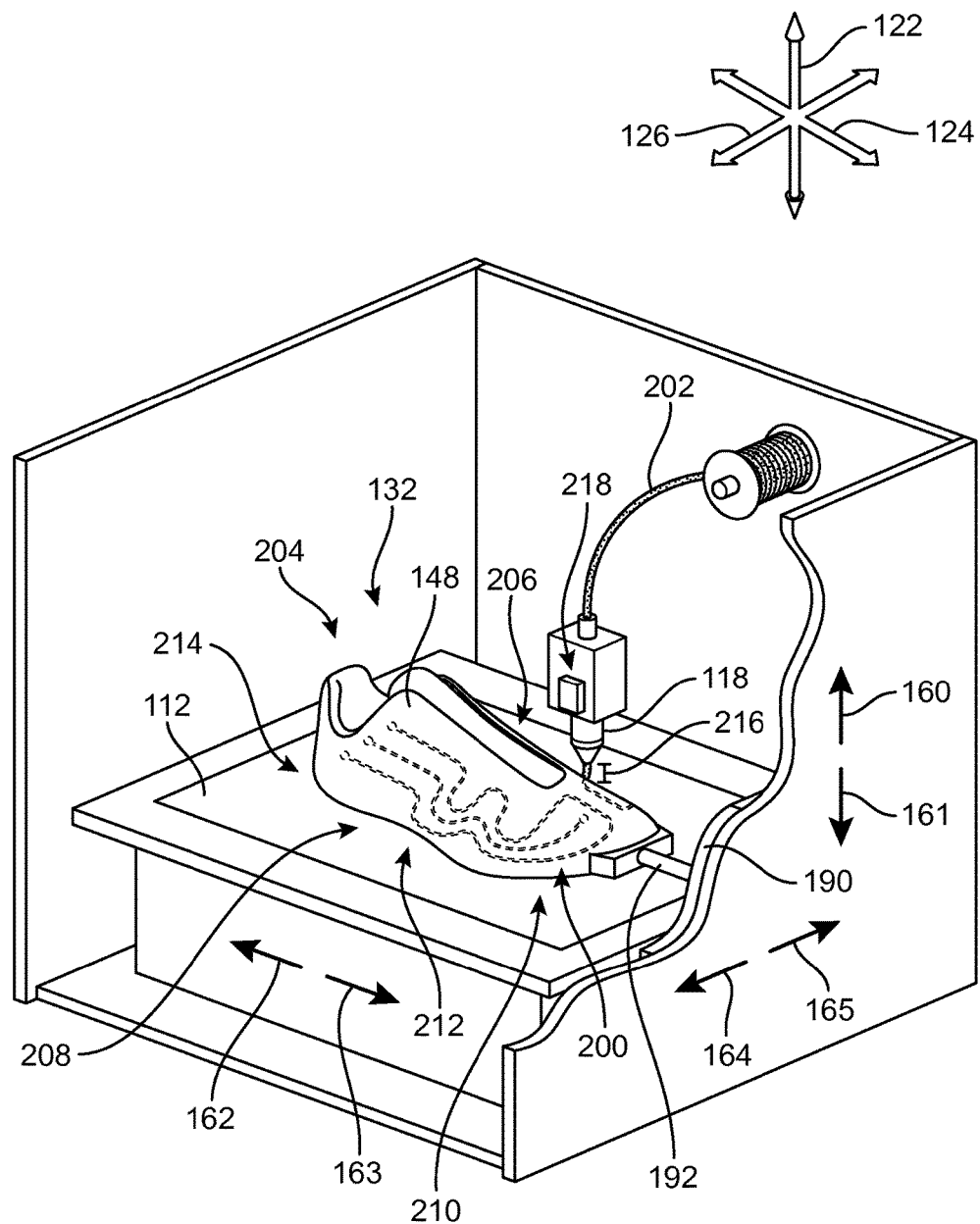
FIG. 2 is a schematic view of an embodiment of a printing device and a base.

For purposes of this description, print distance 216 (as shown in FIG. 2) refers to the distance or height extending along vertical axis 122 between nozzle 118 and print surface 148. Thus, in some embodiments, as print surface 148 may be curved or otherwise vary in height, print distance 216 may increase or decrease without any corresponding vertical motion of nozzle 118 when nozzle moves in the horizontal plane. In other words, print distance 216 may change even though the distance between nozzle 118 and base 112 remains constant due to the contoured geometry of an underlying article. In other embodiments, print distance 216 may remain constant as nozzle 118 moves in the horizontal plane. In one embodiment, due to a vertical motion of nozzle 118, the distance between nozzle 118 and base 112 may vary while nozzle 118 maintains a constant print distance 216 relative to print surface 148. Thus, printing system 100 can maintain a generally constant distance between nozzle 118 and print surface 148, which can facilitate printing directly to objects with some curvature and/or surface texture.

In different embodiments, one or more articles 130 can be associated with a second actuating system 190 that may be included in printing system 100. Second actuating system 190 may include various components, devices, and systems that facilitate the motion of articles 130 within housing 110. Although the exemplary embodiment depicts a particular rectangular box-like geometry for second actuating system 190, other embodiments could use any system having any geometry and/or design. The shape and size of the actuating system could vary according to factors including the article being printed on, the size and shape of parts that may be formed within printing device 102, as well as possibly other factors.

In particular, second actuating system 190 may include provisions to move articles 130 in any horizontal direction and/or vertically oriented direction to facilitate the position of articles 130 underneath nozzle 118 for printing along a three-dimensional surface. To this end, embodiments of second actuating system 190 may include one or more tracks, rails, and/or similar provisions to hold articles 130 at various positions and/or orientations within housing 110. Embodiments may also include any kinds of motors, such as a stepper motor or a servo motor, to move articles 130 along a track or rail, and/or to move one or more tracks or rails relative to one another. In some embodiments, there may be a securing device 192, such as a clamp, claw, or other adjustable gripping member, in second actuating system 190 to provide a means of attachment between second actuating system 190 and articles 130. In other embodiments, there may be no securing device 192. It should be noted that portions of second actuating system 190 may be positioned in various locations within printing system 100 in order to provide the necessary orientation to articles 130.

Thus, second actuating system 190 can be configured to move an article in one or more directions. In some embodiments, an actuating system could move an article in a single linear direction, or two linear directions. In other embodiments, an actuating system could move an article in at least two perpendicular directions. In still other embodiments, an actuating system could move an article in at least three perpendicular directions. For example, in the exemplary embodiment shown in FIG. 1, second actuating system 190 may be configured to move articles 130 in first direction 160, second direction 161, third direction 162, fourth direction 163, fifth direction 164, and sixth direction 165. As seen in FIG. 1, first direction 160 and second direction 161 may be associated with a vertical axis of housing 110, while third direction 162, fourth direction 163, fifth direction 164, and sixth direction 165 may be associated with horizontal directions of housing 110 (e.g., length and width directions). Of course, while the exemplary embodiment depicts second actuating system 190 capable of moving an article through three independent x-y-z or Cartesian directions, other embodiments may be configured to move an article in six independent directions associated with a non-Cartesian coordinate system (e.g., a spherical coordinate system or a cylindrical coordinate system). Still further, in other cases an actuating system could move an article through six different directions that may not be orthogonal (e.g., directions of an oblique coordinate system).

In certain embodiments, printing system 100 may selectively move the article using second actuating system 190 or another mechanism. In one embodiment, printing system 100 may move an article in three directions simultaneously. For example, printing system 100 may move articles 130 in first direction 160 away from base 112 while simultaneously moving articles 130 in third direction 163 and/or in fifth direction 164 in a direction generally parallel to base 112. In other embodiments, a position along one direction is maintained while printing system 100 selectively moves articles 130 in another direction. In certain embodiments, printing system 100 may move articles 130 with respect to vertical axis 122 away from or toward base 112 while simultaneously maintaining a base position of articles 130 with respect to lateral axis 126 and longitudinal axis 124. For example, printing system 100 may move articles 130 in first direction 160 away from base 112 while simultaneously maintaining a base position of articles 130 in third direction 162, fourth direction 163, fifth direction 164, and sixth direction 165. In some embodiments, printing system 100 may maintain print distance 216 from articles 130 along vertical axis 122 while simultaneously moving articles 130 parallel to the base of housing 110. For example, printing system 100 may maintain print distance 216 from articles 130 along vertical axis 122 while simultaneously moving articles 130 in directions aligned with lateral axis 126 and longitudinal axis 124.

In some embodiments, components of printing system 100 associated with second actuating system 190 may be specifically adapted to secure articles 130 in a fixed position or orientation. For example, some embodiments may include various kinds of mounting devices, harnesses, temporary adhesives, or other provisions that may temporarily fix or hold the position of an article relative to housing 110. Such provisions may help precisely orient a specific portion of an article towards nozzle 118 (and correspondingly towards other components of printing device 102). For example, some embodiments could utilize a harness that fixes the orientation and position of an article over base 112 so that a three-dimensional design can be printed onto any desired portion of an article, such as an article of footwear. These provisions may also reduce the tendency of an article to move or jostle as the position of base 112 is adjusted, or nozzle 118 extrudes a print material onto articles 130.

Furthermore, in some embodiments, second actuating system 190 or another mechanism of printing system 100 may rotate or reposition articles 130 in a horizontal plane about a horizontal axis oriented with respect to vertical axis 122, or in a vertical plane about a vertical axis oriented with respect to longitudinal axis 124 and/or lateral axis 126. For example, in some embodiments, there may be a mechanism allowing between about a 10 and about a 90 degree rotation of articles 130. In other embodiments, there may be a mechanism allowing at least about a 180 degree rotation of articles 130. In one embodiment, there may be a mechanism that allows about a 360 degree rotation. In other embodiments, there may be between about a 180 and about a 360 degree rotation of articles 130 in printing system 100. For example, in one embodiment, printing system 100 may include provisions for rotation of articles 130 in the horizontal plane about a horizontal axis oriented with respect to vertical axis 122. In another embodiment, printing system 100 may include provisions for rotation of articles 130 in the vertical plane about a vertical axis oriented with respect to longitudinal axis 124 and/or lateral axis 126. In some embodiments, printing system 100 may include provision for rotation of articles 130 in both the horizontal and vertical planes. In one embodiment, repositioning movement of articles 130 may not be circular (i.e., rotational), and instead may involve a non-circular, linear, or otherwise irregular repositioning of articles 130.

Thus, in some embodiments, articles 130 may be oriented in multiple positions in housing 110 during printing. It should be noted that first actuating system 114 and second actuating system 190 may be operated simultaneously or independently during use of printing system 100. In addition, first actuating system 114 and second actuating system 190 may be connected in such a way so as to allow both to operate in conjunction with one another during printing. Furthermore, in some embodiments, printing device 102 may include base 112 that can move independently of second actuating system 190. In other embodiments, second actuating system 190 may be fixed to base 112 such that the components move or operate in concert. In one embodiment, there may be no base, such that second actuating system 190 operates to move an article that is independent of a platform or tray surface.

In some embodiments, repositioning may be initiated or performed by a user. For example, in some embodiments, first actuating system 114 and/or second actuating system 190 can be operated manually by a user. In other embodiments, repositioning of articles 130 may occur in an automated manner by printing system 100. For example, there may be provisions for automating the operation of first actuating system 114 and second actuating system 190. In one example, some embodiments could include motors and/or other provisions for automatically driving nozzle 118 to various positions along one or more tracks. Moreover, in automated embodiments, the position or speed of nozzle 118 and/or articles 130 could be adjusted using controls provided in printing system 100, or using an associated system, such as computing system 104, which is discussed in further detail below.

It will be understood that for purposes of illustration, the components, devices and systems of printing device 102 are shown schematically in FIG. 1. It will therefore be appreciated that embodiments may include additional provisions not shown, including specific parts, components, and devices that facilitate the operation of first actuating system 114, second actuating system 190, and nozzle assembly 116. For example, first actuating system 114 is shown schematically as including several tracks or rails, but the particular configuration and number of parts comprising first actuating system 114 may vary from one embodiment to another.

As discussed above, printing system 100 can include provisions to control and/or receive information from printing device 102. These provisions can include a computing system 104 and a network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some cases, a print server may be primarily responsible for controlling and/or communicating with printing device 102, while a separate computer (e.g., desktop, laptop, or tablet) may facilitate interactions with a user. Computing system 104 can also include one or more storage devices including but not limited to magnetic, optical, magneto-optical, and/or memory, including volatile memory and non-volatile memory.

In the exemplary embodiment of FIG. 1, computing system 104 may comprise a central processing device 185, a viewing interface 186 (e.g., a monitor or screen), input devices 187 (e.g., keyboard and mouse), and software for designing a computer-aided design ("CAD") representation 189 of a printed structure. In at least some embodiments, the CAD representation 189 of a printed structure may include not only information about the geometry of the structure, but also information related to the materials required to print various portions of the structure.

In some embodiments, computing system 104 may be in direct contact with printing device 102 via network 106. Network 106 may include any wired or wireless provisions that facilitate the exchange of information between computing system 104 and printing device 102. In some embodiments, network 106 may further include various components such as network interface controllers, repeaters, hubs, bridges, switches, routers, modems and firewalls. In some cases, network 106 may be a wireless network that facilitates wireless communication between two or more systems, devices, and/or components of printing system 100. Examples of wireless networks include, but are not limited to: wireless personal area networks (including, for example, Bluetooth), wireless local area networks (including networks utilizing the IEEE 802.11 WLAN standards), wireless mesh networks, and mobile device networks, as well as other kinds of wireless networks. In other cases, network 106 could be a wired network including networks whose signals are facilitated by twisted pair wires, coaxial cables, and optical fibers. In still other cases, a combination of wired and wireless networks and/or connections could be used.

Printing system 100 may be operated as follows to form one or more structures using a 3D printing, or additive, process. Computing system 104 may be used to design a structure. This may be accomplished using some type of CAD software, or other kind of software. The design may then be transformed into information that can be interpreted by printing device 102 (or a related print server in communication with printing device 102). In some cases, the design may be converted to a 3D printable file, such as a stereolithography file (STL file).

Before printing, an article may be placed onto base 112 or may be secured using second actuating system 190. Once the printing process is initiated (by a user, for example), printing device 102 may begin depositing material onto the article. This may be accomplished by moving nozzle 118 (using first actuating system 114) to build up layers of a structure using deposited material. In embodiments where fused filament fabrication is used, material extruded from nozzle 118 may be heated so as to increase the pliability of the heat moldable material as it is deposited.

Although some of the embodiments shown in the figures depict a system using filament fused fabrication printing technologies, it will be understood that still other embodiments could incorporate one or more different 3D printing technologies. For example, printing system 100 may use a tack and drag print method, as described in the Tag and Drag case. Moreover, still other embodiments could incorporate a combination of filament fused fabrication and another type of 3D printing technique to achieve desired results for a particular printed structure or part.

In different embodiments, printing device 102 may use a variety of different materials for forming 3D parts, including, but not limited to: thermoplastics (e.g., polyactic acid and acrylonitrile butadiene styrene), high density polyethylene, eutectic metals, rubber, clays (including metal clays), Room Temperature Vulcanizing silicone (RTV silicone), and porcelain, as well as possibly other kinds of materials known in the art. In embodiments where two or more different printed or extruded materials are used to form a part, any two or more of the materials disclosed above could be used. In some embodiments, printing device 102 may extrude, discharge or use a material or thread and/or yarn composition as described in U.S. Pat. No. 9,410,270, the disclosure of which is herein incorporated by reference in its entirety, and is hereinafter referred to as the "Thread Structure Composition" case.

As discussed above, in some embodiments, printed structures may be printed directly to one or more articles 130. The term "articles" is intended to include both articles of footwear (e.g., shoes) and articles of apparel (e.g., shirts and pants), as well as various other objects. As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots, for example. As used throughout this disclosure, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of footwear, the disclosed embodiments may further be equally applied to any article of clothing, apparel, or equipment that includes 3D printing. For example, the disclosed embodiments may be applied to hats, caps, shirts, jerseys, jackets, socks, shorts, pants, undergarments, athletic support garments, gloves, wrist/arm bands, headbands, any knit material, any woven material, any nonwoven material, sports equipment, etc. Thus, as used throughout this disclosure, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, etc. As used throughout this disclosure, the terms "article of apparel," "apparel," "article of footwear," and "footwear" may also refer to a textile, a natural fabric, a synthetic fabric, a knit, a woven material, a nonwoven material, a mesh, a leather, a synthetic leather, a polymer, a rubber, and a foam.

In an exemplary embodiment, printing device 102 may be configured to print one or more structures directly onto a portion of one of articles 130. Articles 130 comprise exemplary articles that may receive a printed structure directly from printing device 102, for example including an article of footwear 132, a helmet 136, or a glove 134, each of which has a three-dimensional configuration. Articles 130 may also include an upper or a t-shirt, which have a flattened configuration. Thus, it will be understood that printing device 102 may be used to apply printed material to articles 130 in three-dimensional configurations and/or flattened configurations.

In order to apply printed materials directly to one or more articles, printing device 102 may be capable of printing onto the surfaces of various kinds of materials. Specifically, in some cases, printing device 102 may be capable of printing onto the surfaces of various materials such as a textile, a natural fabric, a synthetic fabric, a knit, a woven material, a nonwoven material, a mesh, a leather, a synthetic leather, a polymer, a rubber, and a foam, or any combination thereof, without the need for a release layer interposed between a substrate and the bottom of the printed material, and without the need for a perfectly or near-perfectly flat substrate surface on which to print. For example, the disclosed methods may include printing a resin, acrylic, thermoplastic material, or ink material onto a fabric, for example, a knit material, where the material is adhered or bonded to the fabric and where the material does not generally delaminate when flexed, rolled, worked, or subjected to additional assembly processes or steps. As used throughout this disclosure, the term "fabric" may be used to refer generally to materials chosen from any textile, natural fabric, synthetic fabric, knit, woven material, nonwoven material, mesh, leather, synthetic leather, polymers, rubbers, foam, and combinations thereof.

Although some embodiments may use printing device 102 to print structures directly onto the surface of a material, other embodiments may include steps of printing a structure onto a tray, base, or release paper, and then joining the printed structure to an article in a separate step. In other words, in at least some embodiments, printed structures need not be printed directly to the surface of articles 130.

As previously noted, printing device 102 may be configured to print directly onto various articles 130. Similarly, printing device 102 may be configured to print on various surface topographies. For example, as shown in FIG. 2, a three-dimensional (non-flat) first article 204 is depicted. In FIG. 2, first article 204 includes a forefoot region 210, a midfoot region 212, and a heel region 214, as described above. Furthermore, first article 204 includes a medial side 206 and a lateral side 208.

In other embodiments, first article 204 can include one or more protrusions and/or cavities, curves, contours, and other non-flat surfaces. Moreover, printing device 102 may print on surfaces having various shapes. For example, as shown, first article 204 is a generally oblong, irregularly shaped object, comprising a partially assembled upper for an article of footwear. In other embodiments, first article 204 may include a variety of three-dimensional contours, geometries, or shapes, including, for example, circular geometries, triangular geometries, rectangular geometries, sock-like geometries, sandal-like geometries, irregularly shaped geometries, or geometries corresponding to other components for an article of footwear. As shown in FIG. 2, first article 204 includes print surface 148 that faces toward nozzle 118, as well as a lower surface (not shown) that is in contact with base 112.

In some embodiments, the horizontal or vertical position of articles 130 may be adjusted using a sensor 218. Sensor 218 may be adjacent to nozzle 118 in some embodiments. Sensor 218 may help to align the position of articles 130 with print nozzle 118. In other words, sensor 218 may provide printing system 100 with a mechanism for determining the movement of articles 130 relative to nozzle 118, for example, during repositioning of articles 130 in any of the usual x, y, and z spatial directions as described above with reference to the actuating systems. Moreover, some cases may include steps of adjusting nozzle 118 to better align nozzle 118 with the selected surface of articles 130 that will be printed on. Thus, in some embodiments, printing system 100 may include sensor 218 that provides printing system 100 with information regarding the position of articles 130 and/or nozzle 118. Sensor 218 may operate in conjunction with computing system 104 to provide greater automation to printing system 100.

It should be noted that in some embodiments, base 112 may be removed and articles 130 may be secured by other means in printing device 102. For example, article of footwear 132 may be attached to a device or component that holds article of footwear 132 in position within printing device 102, such as securing device 192. Securing device 192 may be part of second actuating system 190, or may be a separate device. In one embodiment, securing device 192 can be moved or rotated such that first article 204 changes orientation or position, permitting nozzle 118 to print along substantially all areas and surfaces of first article 204. As shown in FIG. 2, securing device 192 may be used to hold, grip, or reposition first article 204.

As previously mentioned, nozzle 118 is configured to extrude various materials. For example, as shown, nozzle 118 may extrude a substantially elongated continuous composite yarn 202, or nozzle 118 may extrude multiple elongated continuous composite yarn segments. A composite yarn may include a composition as described in the Thread Structure Composition case. For example, in some embodiments, composite yarn 202 may include a melt resistant material and/or a heat moldable material. As used herein, heat moldable material includes thermoplastic. In some embodiments, a composite yarn is at least partially formed of thermoplastic.

It should be noted that in different embodiments, the print material may be ejected or otherwise emitted via nozzle 118 in the form of droplets. One of ordinary skill in the art will recognize that the form of the droplets may vary depending on the actual material ejected or otherwise emitted from nozzle 118. In some embodiments, the droplets may thus be any viscosity liquid material, or even a semi-solid material. Consistent with an embodiment, the droplets may be any desired material or phase of material suitable for use in printing system 100.

In different embodiments, a continuous segment of composite yarn 202 extends over base 112 of printing device 102 including first article 204. For example, composite yarn 202 extends over a curved surface 200 in FIG. 2. A composite yarn 202 or other printing material may be attached to curved surface 200 using various techniques and various materials. In some embodiments, a heat moldable material bonds directly to the attaching surface. Additionally, in certain embodiments, the heat moldable material bonds to a melt resistant material.

In some embodiments, a heating system is configured to heat a portion of composite yarn 202 into a liquid state. Accordingly, in various embodiments, printing system 100 may be configured to force a portion of composite yarn 202 onto curved surface 200 by moving nozzle 118 along various directions (see FIGS. 3-10). Composite yarn 202 may then transition from the liquid state to a solid state to bond with an attaching surface. As discussed below, nozzle 118 may maintain print distance 216 between nozzle 118 and a curved surface 200 to allow composite yarn 202 to bond with curved surface 200 (see FIGS. 3-10).

In FIGS. 3-18, a portion of printing system 100 is depicted. For purposes of convenience some components of printing system 100 are not shown. It should be understood that FIGS. 3-18 are for purposes of illustration only, and the components described above with respect to FIGS. 1 and 2 may be included or referred to in the following description while not illustrated in the figures. As shown in the figures, in different embodiments, securing device 192 may be used to hold, grip, or reposition the article or print surface 148. In other embodiments, a different component or system may be used to hold, rotate, or reposition the articles.

In some instances it is desirable to print directly along the surface of an object or articles 130 that includes contours, or is three-dimensionally configured. Selectively attaching composite yarn 202 along a curved surface 200 can allow formation of designs, structures, and other features directly onto a pre-assembled or pre-made object. FIGS. 3-10 illustrate embodiments of methods of printing a material along a series of curved surfaces of a second article 300. The methods illustrated may be implemented on various devices, may utilize various materials, and use different types of bases. Accordingly, the exemplary methods illustrated in FIGS. 3-10 are for illustrative purposes only. In some embodiments, the printing can occur over articles 130 that have been previously manufactured or fabricated, or partially manufactured, and printing can occur post-manufacture. This can allow customization of articles 130 to be processed more quickly, as well as more cost-efficiently. Furthermore, printing system 100 can allow formation of designs that encompass multiple surfaces and curves of article 130, including surfaces comprising varying materials, and can provide more seamless design appearance.

Figure 3:
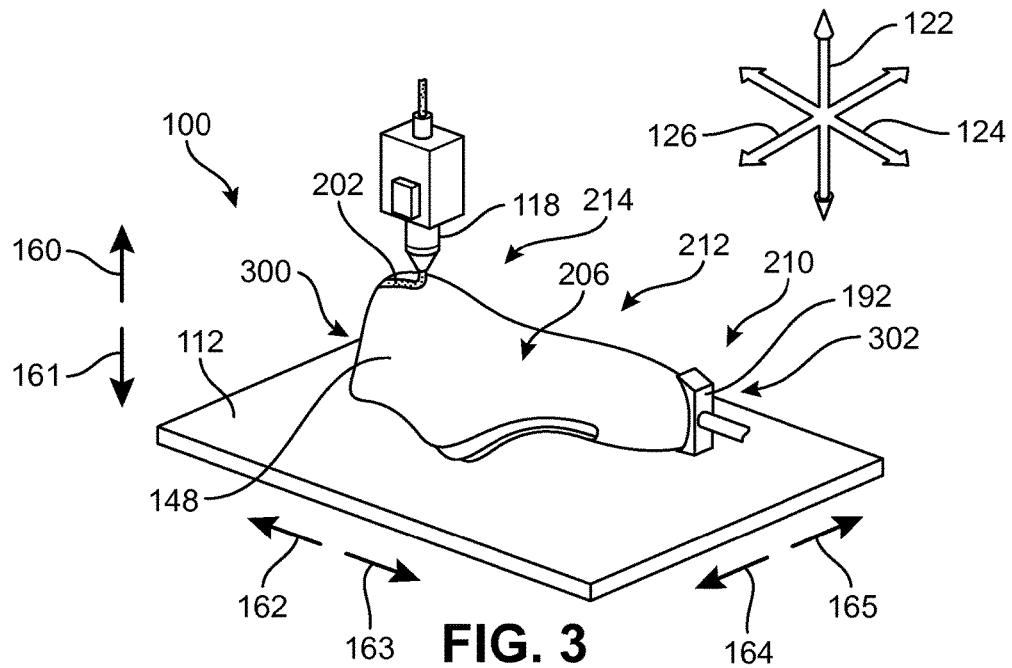
FIG. 3 is a schematic view of an embodiment of an article and a printing device.
Figure 4:
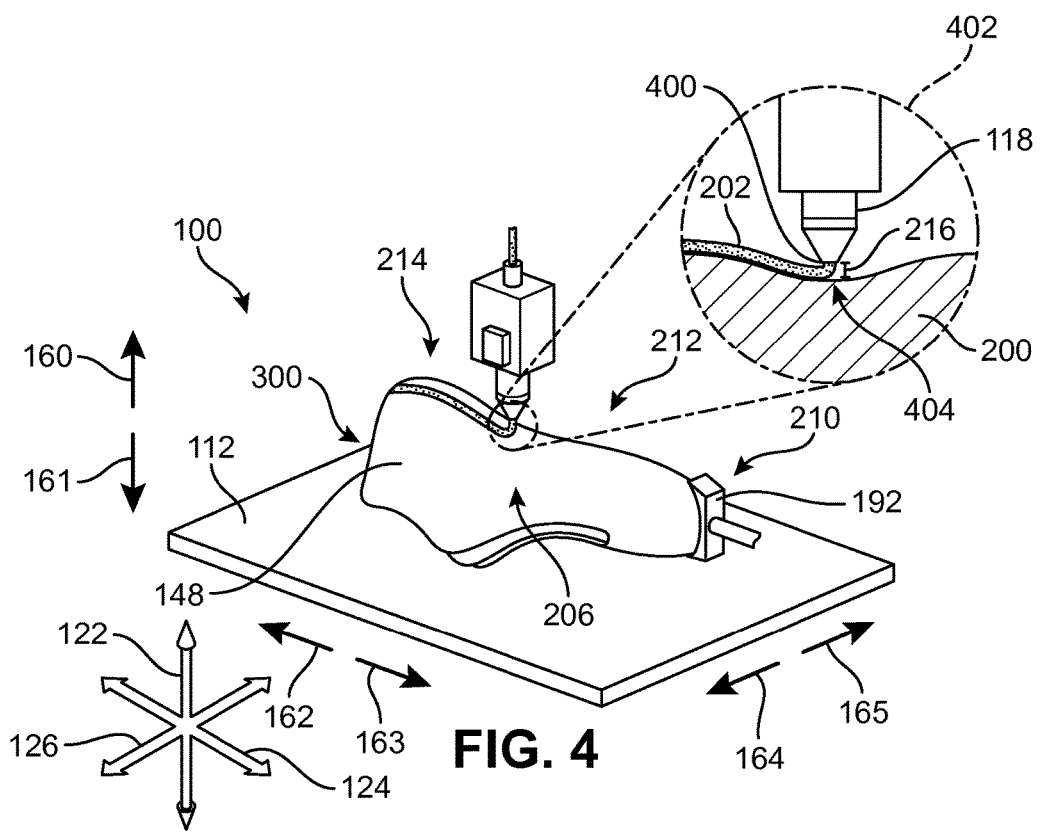
FIG. 4 is a schematic view of an embodiment of an article and a printing device.

In FIG. 3, second article 300 is disposed in a first position 302 within housing 110 (not shown) such that a portion of medial side 206 is presented as print surface 148 to nozzle 118. Nozzle 118 has begun to deposit composite yarn 202 in a direction generally aligned with longitudinal axis 124 of second article 300. Specifically, nozzle 118 deposits composite yarn 202 along heel region 214 of medial side 206 of second article 300. In FIG. 4, nozzle 118 is continuing to move in a direction generally aligned with longitudinal axis 124 and has moved toward midfoot region 212.

As described with reference to FIG. 2, in some embodiments, printing system 100 maintains print distance 216 between nozzle 118 and print surface 148 to allow attachment of composite yarn 202 along curved surface 200. First actuating system 114 (shown in FIG. 1) may allow movement of nozzle 118 in multiple directions. Some embodiments may use one or more features of U.S. Publication Number 2017/0129178, the disclosure of which is herein incorporated by reference in its entirety.

For example, nozzle 118 may be moved in first direction 160 or second direction 161 (i.e., nozzle 118 may move up and down relative to base 112). As shown in a magnified area 402 in FIG. 4, in one embodiment, printing system 100 can maintain a constant print distance 216 between nozzle 118 and print surface 148. In other embodiments, composite yarn 202 may be pushed into print surface 148, and composite yarn 202 may bond with print surface 148 as composite yarn 202 is prodded or tacked onto print surface 148. In such embodiments, print distance 216 may decrease as nozzle 118 is prodded into print surface 148, while print distance 216 may increase as nozzle 118 recedes from print surface 148 following prodding.

It should be noted that in some embodiments, composite yarn 202 is not pushed into print surface 148, and so print distance 216 may remain relatively constant during printing. For example, composite yarn 202 may bond with print surface 148 once composite yarn 202 has been deposited on print surface 148 from a constant print distance 216. Bonding may occur in some embodiments as a result of the composition of composite yarn 202 or other features of printing system 100.

In different embodiments, print distance 216 may comprise varying distances. In some embodiments, print distance 216 may be selected by a user through central processing device 185, as illustrated in FIG. 1. In one embodiment, print distance 216 is greater than a thickness of composite yarn 202. In some embodiments, print distance 216 may be less than the thickness of composite yarn 202 in cases where composite yarn 202 is being pushed or prodded onto print surface 148.

In certain instances it may be desirable to move nozzle 118 along print surface 148 of second article 300 while maintaining a generally constant print distance 216 between nozzle 118 and print surface 148. For example, to allow the flow of composite yarn 202 along a three-dimensional curved surface 200 in a generally smooth and consistent manner, print distance 216 may remain generally constant as nozzle 118 moves along print surface 148. In some embodiments, as shown in FIGS. 3-7, printing system 100 moves nozzle 118 along print surface 148 in a direction generally aligned with longitudinal axis 124 while maintaining a constant print distance 216 between nozzle 118 and print surface 148.

In different embodiments, composite yarn 202 may be disposed, attached, printed, or otherwise joined to any non-flat areas and/or flat areas of print surface 148 as composite yarn 202 is released or extruded. Composite yarn 202 may bond with print surface 148, thereby allowing for printing along one or more curved surfaces 200 (e.g., as shown in magnified area 402). In other embodiments, the printing method applied to curved surface 200 may feature one or more of the methods described in the Tack and Drag case.

Thus, in different embodiments, printing system 100 may be configured to position or attach a thread or composite yarn onto any portions of an article that include various curved surfaces 200. In some embodiments, printing system 100 moves nozzle 118 toward and/or over second article 300. For example, as shown in FIG. 3, printing system 100 moves nozzle 118 along third direction 162, fourth direction 163, fifth direction 164, and/or sixth direction 165 as it deposits composite yarn 202 along print surface 148. As shown in FIG. 4, in certain instances it may be desirable to move nozzle 118 along print surface 148 while maintaining a constant print distance 216 between nozzle 118 and print surface 148 to allow attachment of composite yarn 202 to second article 300.

For example, as shown in FIGS. 3-7, printing system 100 maintains a constant print distance 216 between nozzle 118 and print surface 148 by moving nozzle 118 in first direction 160 or second direction 161 as nozzle moves in the horizontal plane. As such, composite yarn 202 is deposited along print surface 148 and composite yarn 202 can bond with print surface 148, thereby allowing for three-dimensional surface printing. For example, as seen in magnified area 402 of FIG. 4, composite yarn 202 is being laid along a first curved area 404. By adjusting height of nozzle 118 along vertical axis 122, nozzle 118 maintains a constant print distance 216 and composite yarn 202 can be laid or deposited along first curved area 404 in a stable, smooth, continuous manner. It should be noted that in other embodiments, print distance 216 may be increased or decreased over different portions of second article 300 while maintaining print quality.

Figure 5:
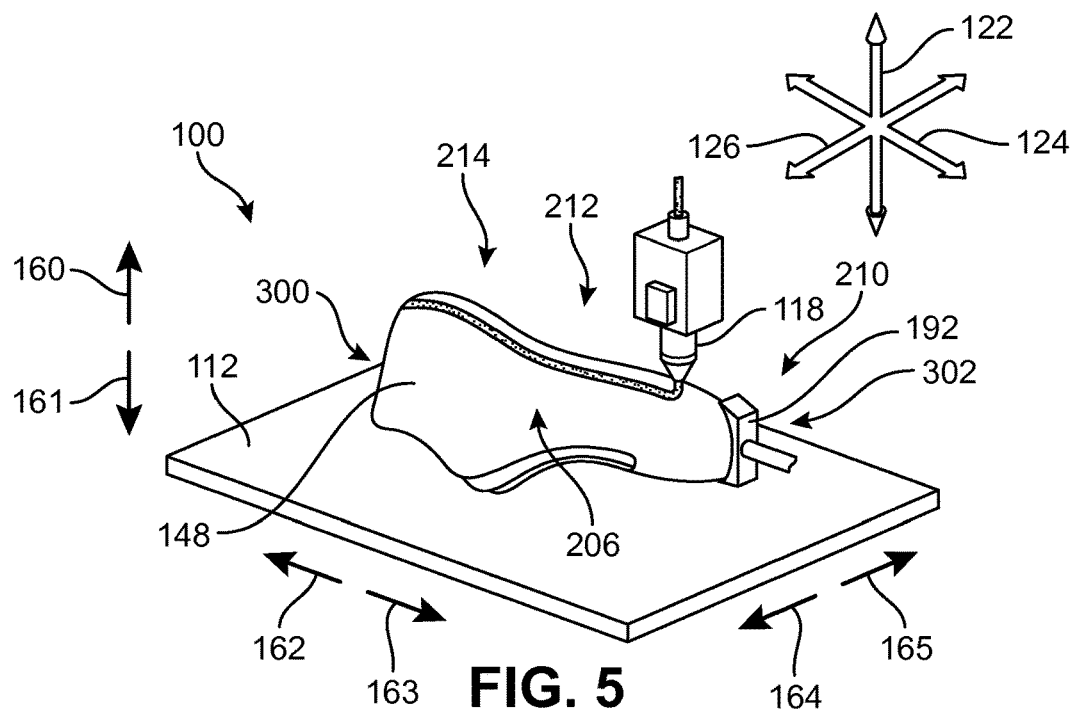
FIG. 5 is a schematic view of an embodiment of an article and a printing device.
Figure 6:
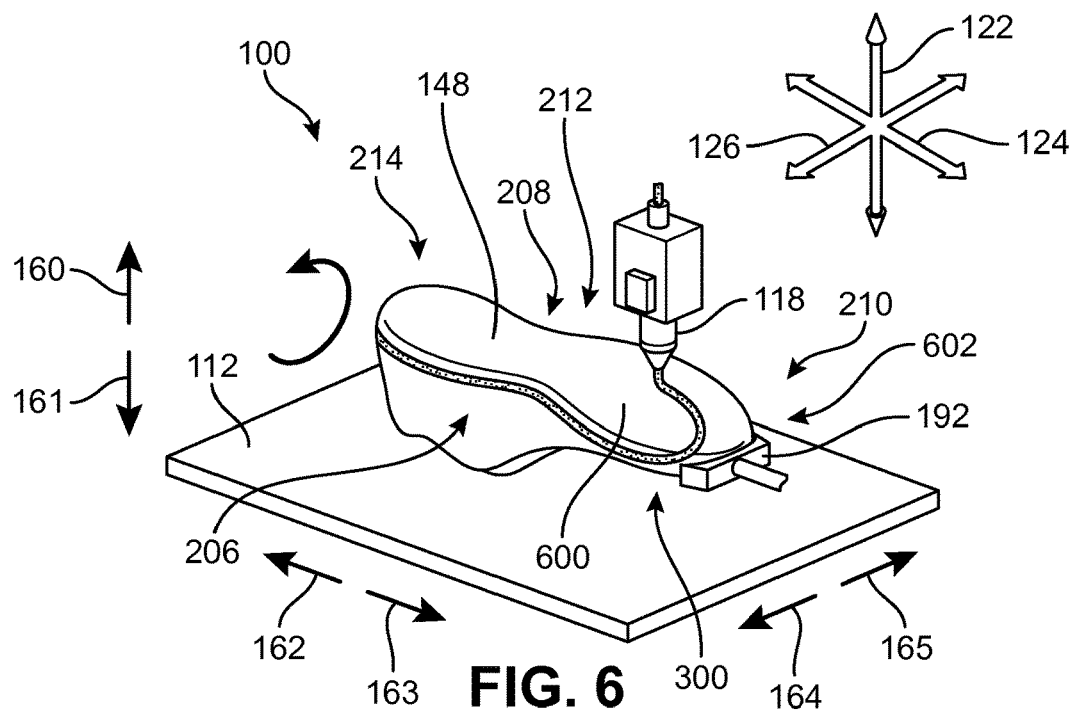
FIG. 6 is a schematic view of an embodiment of an article and a printing device.

In FIG. 5, nozzle 118 has moved farther toward forefoot region 210 along a direction generally aligned with longitudinal axis 124. In some embodiments, it may be desired to continue printing along a different side or surface of second article 300. In some cases, for example, printing may be desired along the bottom surface, or sole region, of second article 300. In FIG. 6, the orientation of second article 300 has been changed to allow a sole region 600 to comprise print surface 148. In other words, in some embodiments, second article 300 may be rotated or otherwise re-oriented to accommodate or provide various areas of second article 300 to nozzle 118. In one embodiment, the repositioning may be performed by second actuating system 190 (discussed in reference to FIG. 1)

Figure 7:
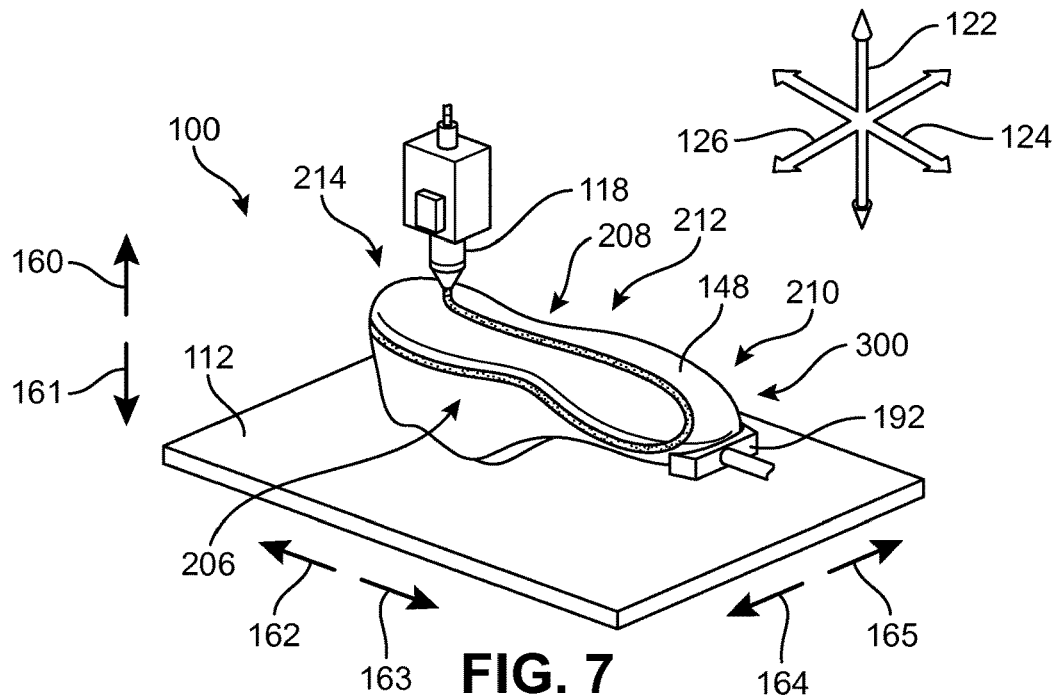
FIG. 7 is a schematic view of an embodiment of an article and a printing device.

In FIG. 6, second article 300 is disposed in a second position 602 within housing 110 (not shown) so that sole region 600 is presented as print surface 148 to nozzle 118. Nozzle 118 has begun to deposit composite yarn 202 in a direction generally aligned with longitudinal axis 124 along forefoot region 210 of sole region 600 of second article 300. In FIG. 7, nozzle 118 is continuing to move in a direction generally aligned with longitudinal axis 124 and has moved past midfoot region 212 into heel region 214.

Figure 8:
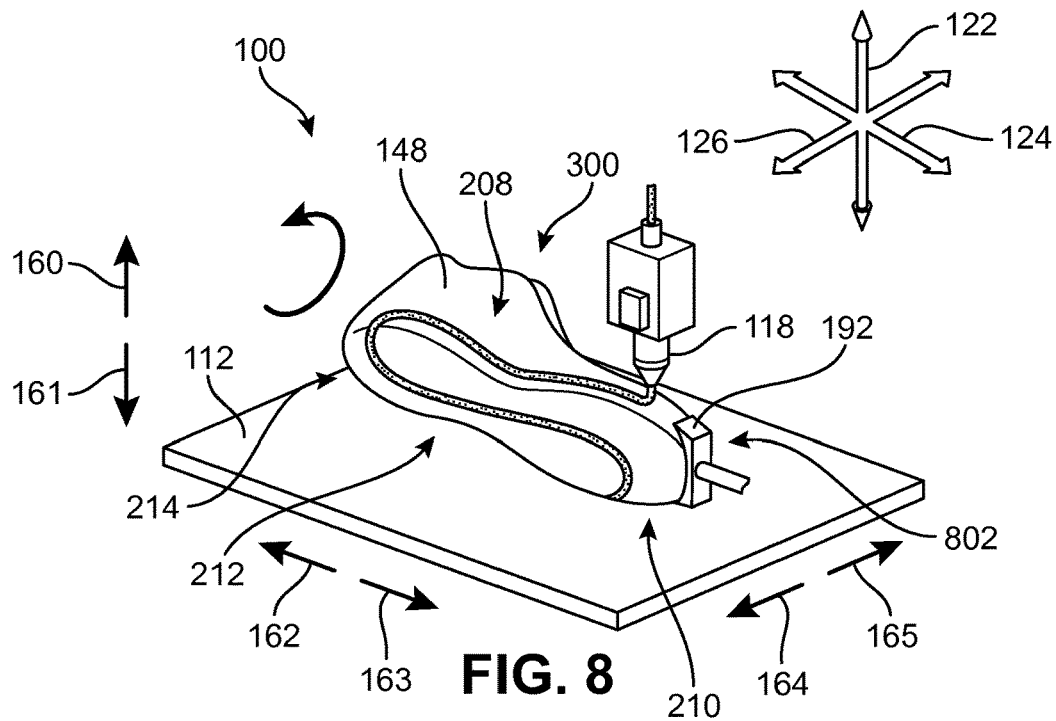
FIG. 8 is a schematic view of an embodiment of an article and a printing device.

Similarly, in some embodiments, it may be desired to continue printing along a different side or surface of second article 300. In some cases, for example, printing may be desired along lateral side 208 of second article 300. In FIG. 8, the orientation of second article 300 has been changed to allow lateral side 208 to comprise print surface 148. In other words, in some embodiments, second article 300 may be rotated or otherwise re-oriented to accommodate or provide different areas of second article 300 to nozzle 118. In FIG. 8, second article 300 is disposed in a third position 802 within housing 110 (not shown) so that lateral side 208 is presented as print surface 148 to nozzle 118. Nozzle 118 has deposited composite yarn 202 in a direction generally aligned with longitudinal axis 124 from heel region 214 toward forefoot region 210 of lateral side 208 of second article 300. Thus, in different embodiments, printing system 100 may print along three-dimensional objects, articles, and various curved or non-flat surfaces.

Figure 9:
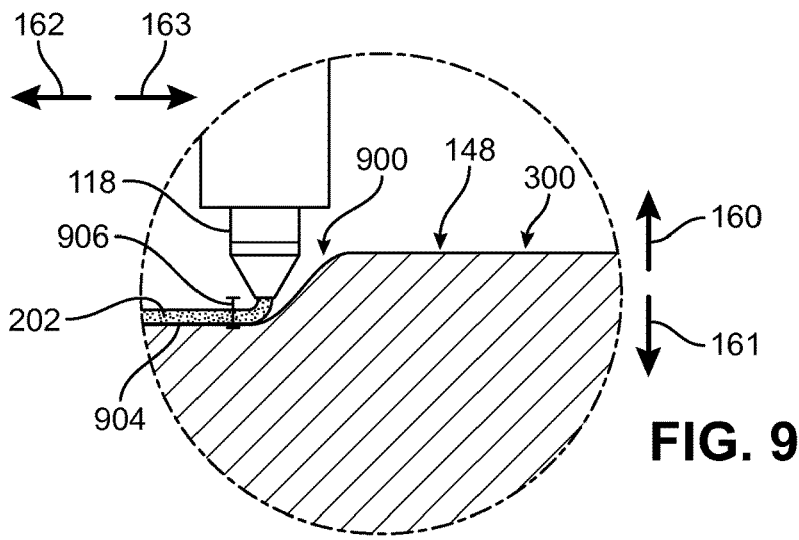
FIG. 9 is a magnified view of an embodiment of a portion of an article and a printing device.
Figure 10:
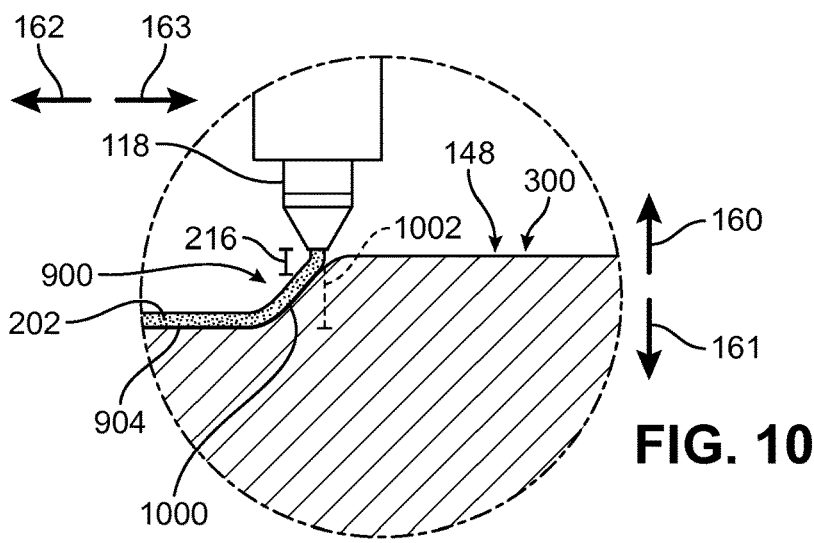
FIG. 10 is a magnified view of an embodiment of a portion of an article and a printing device.

In FIG. 9, a magnified area of a portion of second article 300 is depicted. Nozzle 118 is shown as it moves in fourth direction 163 along a curved region 900. Nozzle 118 is at a first height 906 above a first surface 904. In this case, first height 906 is substantially similar to print distance 216. In FIG. 10, nozzle 118 begins to move upward along first direction 160 during its motion in fourth direction 163 in order to accommodate a slope comprising a second surface 1000 in curved region 900. As nozzle 118 moves along second surface 1000, the height of nozzle 118 relative to first surface 904 is increasing. The change in height is depicted as nozzle 118 shifts from first height 906 and increases to a second height 1002 relative to first surface 904. Composite yarn 202 is deposited along the slope while nozzle 118 maintains a relatively constant print distance 216 from print surface 148 of second article 300.

Figure 11:
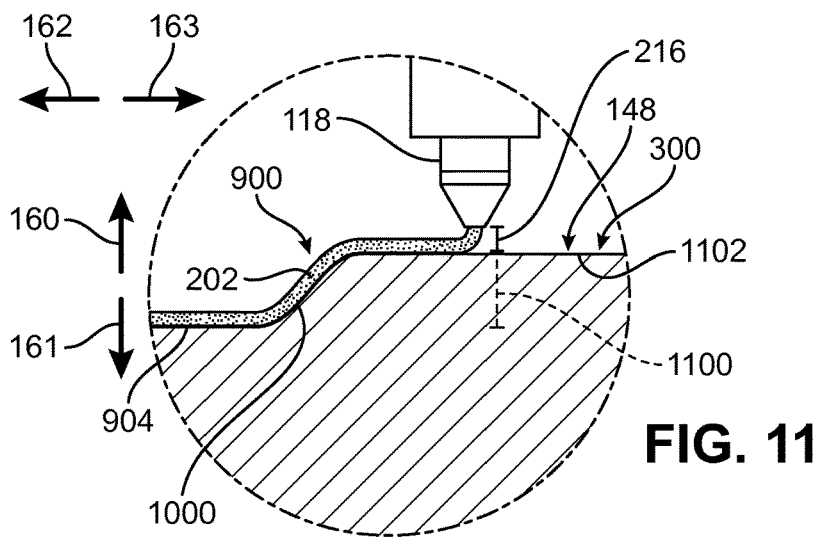
FIG. 11 is a magnified view of an embodiment of a portion of an article and a printing device.

FIG. 11 depicts nozzle 118 having completed printing of composite yarn 202 along second surface 1000 and beginning printing along a relatively flat third surface 1102. There is no longer movement of nozzle 118 in first direction 160 or second direction 161 while the movement of nozzle 118 continues along fourth direction 163 over third surface 1102. In this stage, nozzle 118 has increased to a third height 1100 relative to first surface 904. Third height 1100 is greater than both first height 906 and second height 1002. In other embodiments, a curved region may include different curves and nozzle 118 may move downward in a direction aligned with vertical axis 122 (i.e., second direction 161). In some embodiments, while nozzle 118 may vary in height relative to different contoured portions or surfaces of articles 130, print distance 216 may be maintained at a constant distance, as illustrated in FIGS. 9-11. In other embodiments, nozzle 118 may move along print surface 148 in first direction 160 and/or second direction 161 while it also moves in a horizontally oriented direction, and print distance 216 may also be either increased or decreased.

It should be noted that while the illustrations included herein depict first position 302, second position 602, and third position 802 as stationary, the rotation or movement of second article 300 may be continuous throughout printing. In one embodiment, second article 300 may be rotated or otherwise moved (for example, by second actuating system 190, shown in FIG. 1) at different times or different points during printing. In some embodiments, second article 300 may be turned, moved, or rotated for continuous or intermittent periods of time to provide an optimal print surface 148 to nozzle 118. Adjustments in the positioning or orientation of second article 300 may provide improved print quality and a better attachment of composite yarn 202 to a three-dimensional surface.

As previously noted, the various embodiments allow for any number of attaching surfaces, such as print surface 148. Thus, different three-dimensional structures can be formed along contoured or three-dimensional surfaces. In some embodiments, structures can be formed using any of the methods described in U.S. Patent Publication Number US2014/0020192 to Jones et al., published Jan. 23, 2014 and titled "Footwear Assembly Method with 3D Printing," the disclosure of which is herein incorporated by reference in its entirety. It should be understood that in cases where print surface 148 is non-flat, articles 130 may be repositioned to provide nozzle 118 with an optimal printing surface. In other words, articles 130 may move, rotate, or otherwise adjust position in order to accommodate the movement of nozzle 118, as described with reference to FIGS. 1-11. Thus, in the embodiments discussed below, articles 130 may be moved between first position 302, second position 602, and other positions in order to allow, for example, nozzle 118 to form three-dimensional structures along any curved surfaces of articles 130.

For example, in some embodiments, one or more traction elements may be formed along a portion of an article. In one embodiment, one or more cleats 1204 may be printed. FIGS. 12-17 illustrate isometric views of a printing sequence of multiple 3D layers forming a series of cleats 1204. In different embodiments, cleats 1204 may be printed along irregular, curved, or otherwise substantially non-flat surfaces. Nozzle 118 may accommodate the varying curvature of print surface 148 during printing.

As previously mentioned, nozzle 118 is configured to extrude various materials. For example, as shown, nozzle 118 may extrude a substantially elongated continuous composite yarn 202, or nozzle 118 may extrude multiple elongated continuous thread segments. Composite yarn 202 may include a composition as described in the embodiments of the Thread Structure Composition case.

In different embodiments, nozzle 118 may move in directions aligned with vertical axis 122, directions aligned with longitudinal axis 124, direction aligned with lateral axis 126, or other directions, in order to print along a curved surface, as described with respect to FIGS. 1-11. In other words, the printing of three-dimensional structures along three-dimensional or substantially contoured surfaces may be provided through application and use of printing system 100. Thus, in some embodiments, three-dimensional structures may be formed along different types of articles during varying points of the manufacture of the articles. For example, a structure may be printed on a partially formed article in some embodiments. In other embodiments, a structure may be printed on a fully formed or manufactured article. In one embodiment, an upper may be formed and shaped (for example, over a last) using any process known in the art, and subsequently there may be additional structures formed or printed over the upper using printing system 100.

Figure 12:
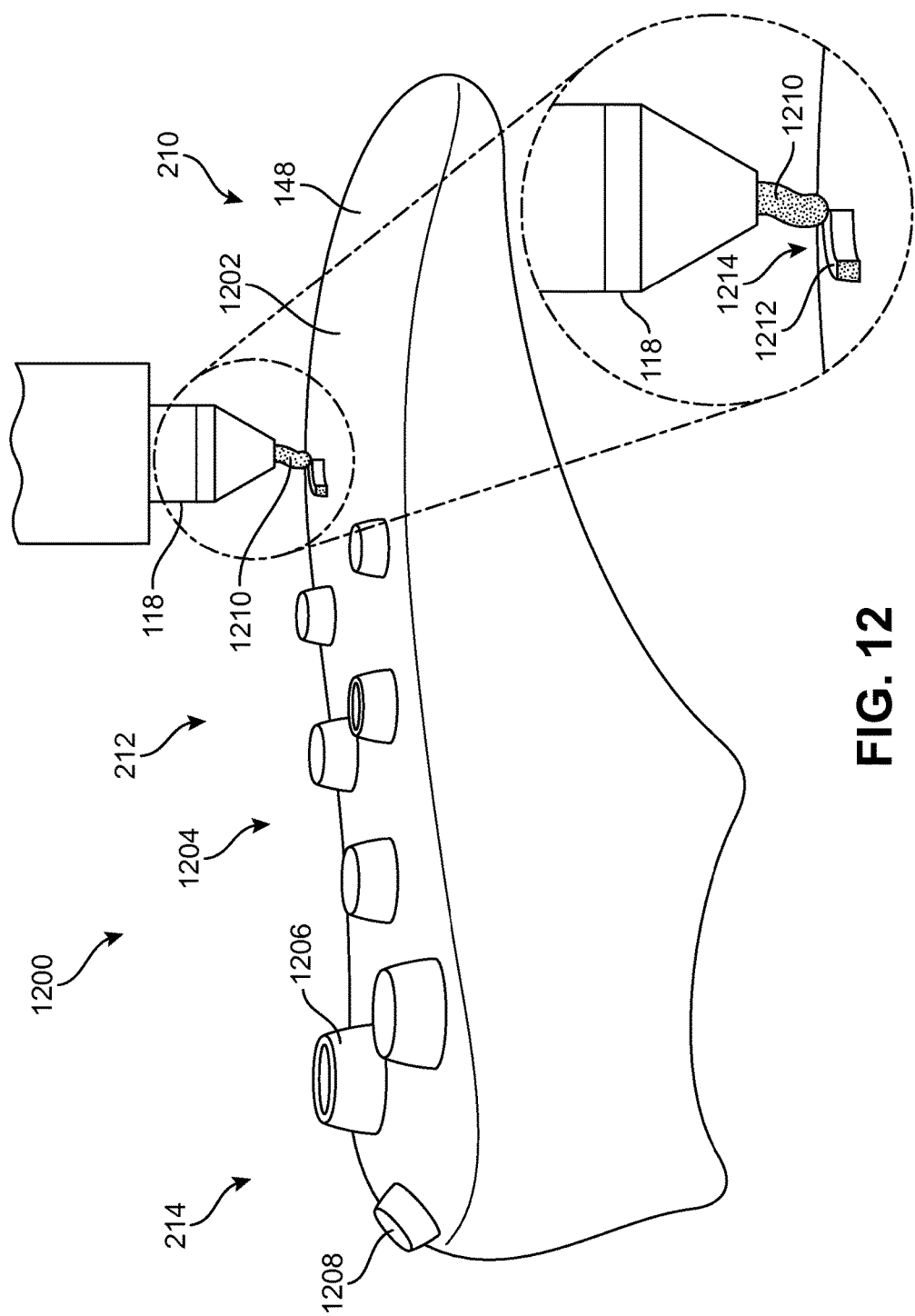
FIG. 12 is a schematic view of an embodiment of an article and a nozzle assembly.

In FIGS. 12-17, cleats 1204 are being formed along an outer curved surface of a sole structure 1202 ("curved surface" 1202) of a third article 1200. FIG. 12 illustrates a printed material 1210 being deposited onto curved surface 1202 near forefoot region 210. In FIG. 12, a series of cleats 1204 have been formed along heel region 214 and midfoot region 212. A first portion 1212 of a first layer 1214 has been printed on curved surface 1202. It should be noted that first portion 1212 and print surface 148 may be joined, attached, bound, coupled, or otherwise connected through one of the techniques described in the Thread Structure Composition case. For example, in one embodiment, heat may be applied during the printing process, forming a melted layer of material between first portion 1212 and print surface 148. The melted layer may bond first portion 1212 (or portions thereof) to print surface 148.

Printed material 1210 may be ejected or otherwise emitted from nozzle 118 in the form of droplets, thread, yarn, or any viscosity liquid material or a semi-solid material. Printed material 1210 may be any desired material or phase of material suitable for use in printing system 100 as described above.

One of ordinary skill in the art will recognize that the printed layers forming printed material 1210 may originate with different materials, colors, chemistries, optional fillers, etc., in order to fully customize the desired properties of third article 1200. Printed material 1210 may also comprise layers having gradients of colors blended amongst the layers, or may comprise gradients of elasticity due to variations in material ejected from nozzle 118 during printing of printed material 1210. For example, printed material 1210 may comprise layers of low elasticity printed material alternated or in conjunction with layers of high elasticity material, as described in the Tack and Drag case.

One of ordinary skill in the art will also recognize that the printed layers forming printed material 1210 may comprise layers of material having at least a first color alternated or in conjunction with layers having at least a second color. For example, printed material 1210 may be designed to impart high strength and low elasticity in heel region 214, while maintaining high elasticity and flexibility in forefoot region 210, and such properties may be accomplished by varying the properties of printed material 1210 through printing of different combinations of materials and layers in any desired manner on any surface of third article 1200.

In different embodiments, the three-dimensional printed structures may be various shapes and sizes, and may be disposed along different areas and types of surfaces of third article 1200. For example, in FIG. 12, cleats 1204 include a first cleat 1206 and a second cleat 1208. First cleat 1206 and second cleat 1208 are generally rounded cylindrical shapes. In the embodiment of FIG. 12, first cleat 1206 is larger relative to second cleat 1208. In addition, first cleat 1206 includes a hollow interior area, whereas second cleat 1208 has a solid or continuous interior volume and surface. Furthermore, second cleat 1208 has been formed along a substantially curved area of heel region 214, whereas first cleat 1206 has been formed along a relatively flat area of heel region 214. In other embodiments, first cleat 1206 and second cleat 1208 may be larger or smaller, may be other geometric or irregular three-dimensional shapes, and may be located along other areas of third article 1200.

Figure 13:
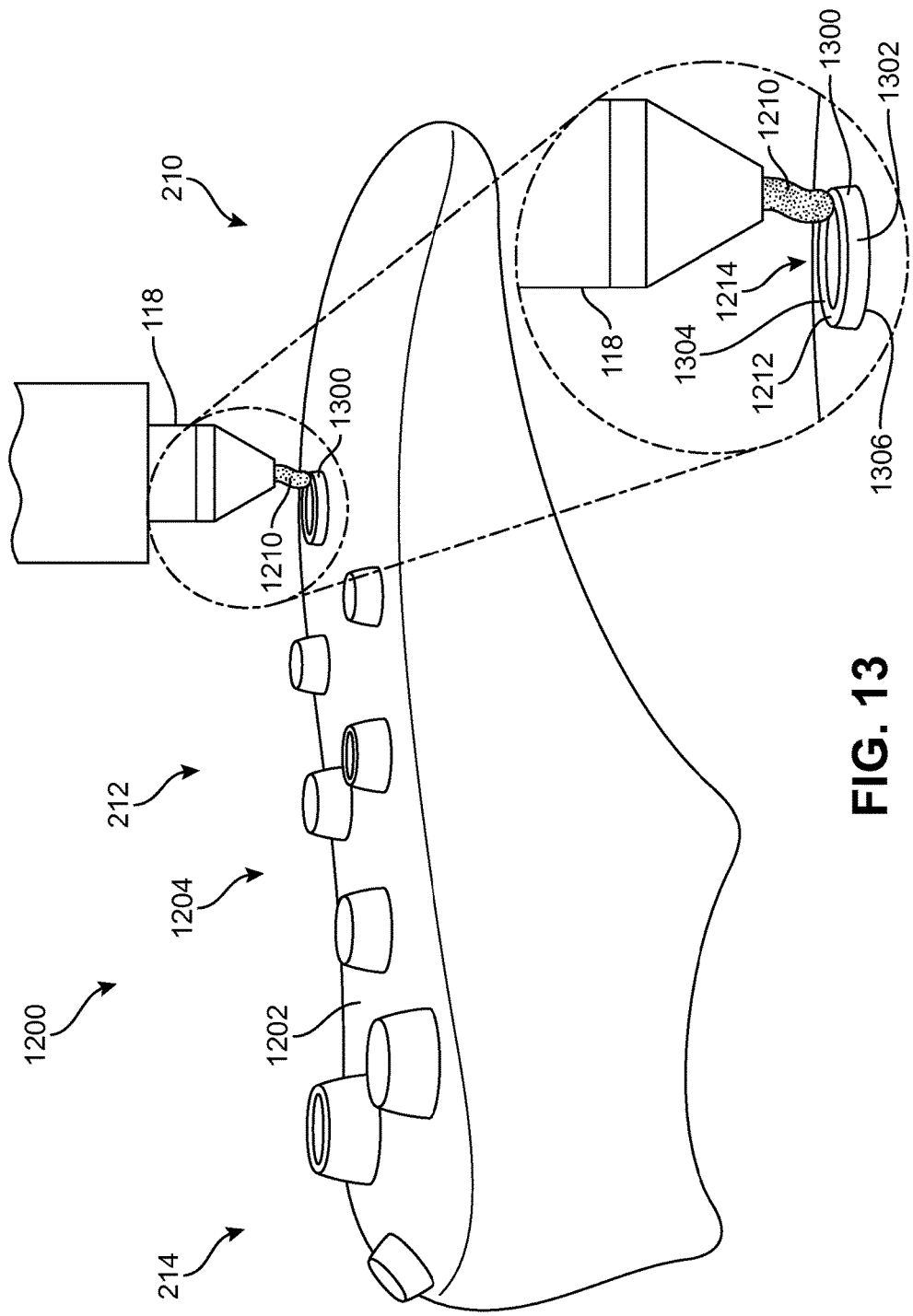
FIG. 13 is a schematic view of an embodiment of an article and a nozzle assembly.
Figure 14:
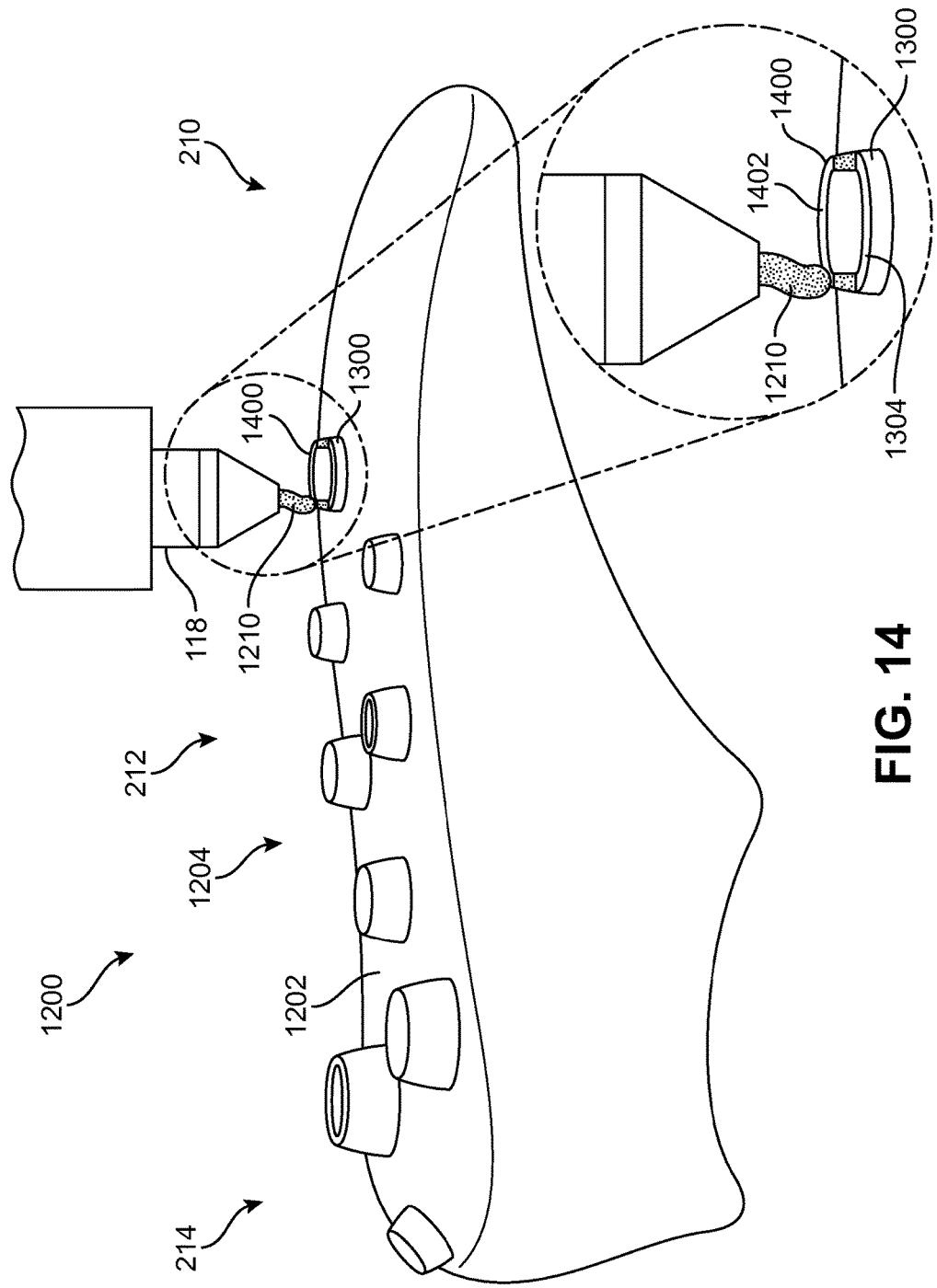
FIG. 14 is a schematic view of an embodiment of an article and a nozzle assembly.

In some embodiments, referring to FIGS. 13 and 14, first segment 1300 may be cured by UV light. However, in other embodiments, first segment 1300 may be deposited without the need to cure the deposited material. Depending on the material used for printing of printed material 1210, the material may be deposited in a liquid, semi-liquid, or otherwise gel-like or viscous phase. The material may then be solidified, at least partially, or cured, for various reasons, or to achieve desired properties, for example, to enhance durability, adhesion, or bonding of printed material 1210 to curved surface 1202. For purposes of this description, "segments" of printed material 1210 refer to the accumulation of one or more layers of printed material 1210 forming at least a portion of a three-dimensional structure. In some embodiments, segments may comprise areas or portions of printed material 1210 that are smaller than or larger than the segments illustrated in the figures below. In some cases, for example, cleats 1204 may vary in height with respect to one another and may each comprise a different number of layers or segments.

In the depiction of FIG. 13, printing is continuing. In FIG. 13, a first segment 1300 has been formed along curved surface 1202. First segment 1300 is comprised of first layer 1214, where first layer 1214 now includes first portion 1212 and an additional second portion 1302. A bottom surface 1306 of first segment 1300 is in contact with curved surface 1202, and an upper surface 1304 is associated with the top of first segment 1300. Thus, in some cases, curved surface 1202 comprises the "print surface" 148 described with reference to FIGS. 1-11, providing a printing surface for nozzle 118. In some embodiments, printing of cleats 1204 may include movement of nozzle 118 in a generally repeating or irregularly round, cyclical, repetitive, or circular motion to form the structures. In other embodiments, nozzle 118 may move in other ways to form, for example, the solid (filled-in) structures, such as second cleat 1208.

In FIG. 14, a first portion 1402 of a second segment 1400 (comprising at least one printed layer) of printed material 1210 is being deposited onto upper surface 1304 of previously printed first segment 1300. It should be noted that second segment 1400 (and any subsequent segments) need not be deposited only on the immediately underlying segment. In different embodiments, variations in printing patterns or thicknesses of layers are possible. For example, second segment 1400 may be deposited on any desired portion of curved surface 1202, which may include partial or complete coverage of first segment 1300, or may include no coverage of first segment 1300. For example, second segment 1400 may be partially deposited on first segment 1300 and partially deposited on the bottom surface of curved surface 1202. It should also be noted that first segment 1300 and second segment 1400 may be joined, attached, bound, coupled, or otherwise connected through one of the techniques described in the Thread Structure Composition case. For example, in one embodiment, heat may be applied during the printing process, forming a melted layer of material between upper surface 1304 of first segment 1300 and a bottom surface of second segment 1400. The melted layer may bond first segment 1300 (or portions of first layer 1214) to second segment 1400.

Figure 15:
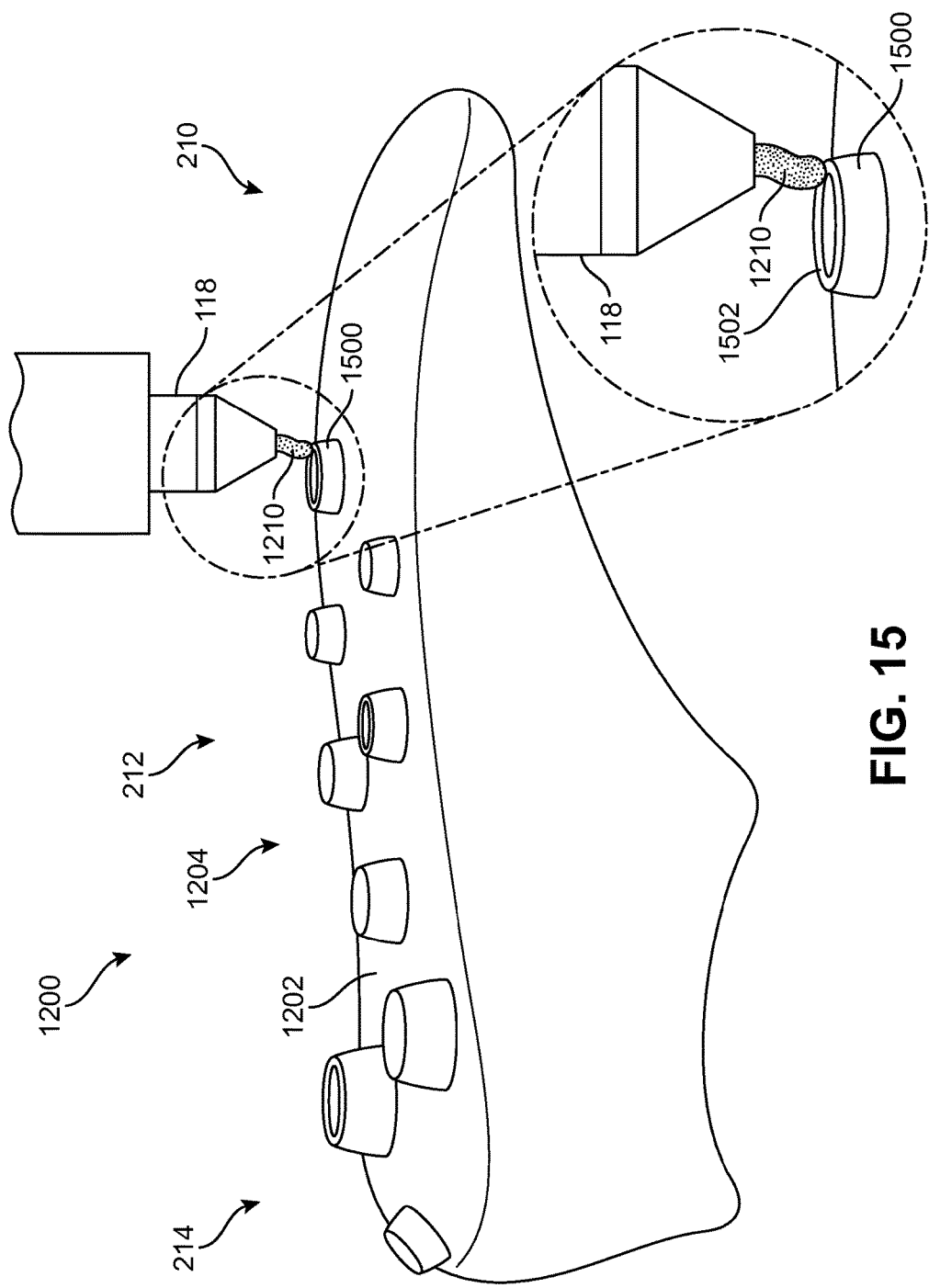
FIG. 15 is a schematic view of an embodiment of an article and a nozzle assembly.
Figure 16:
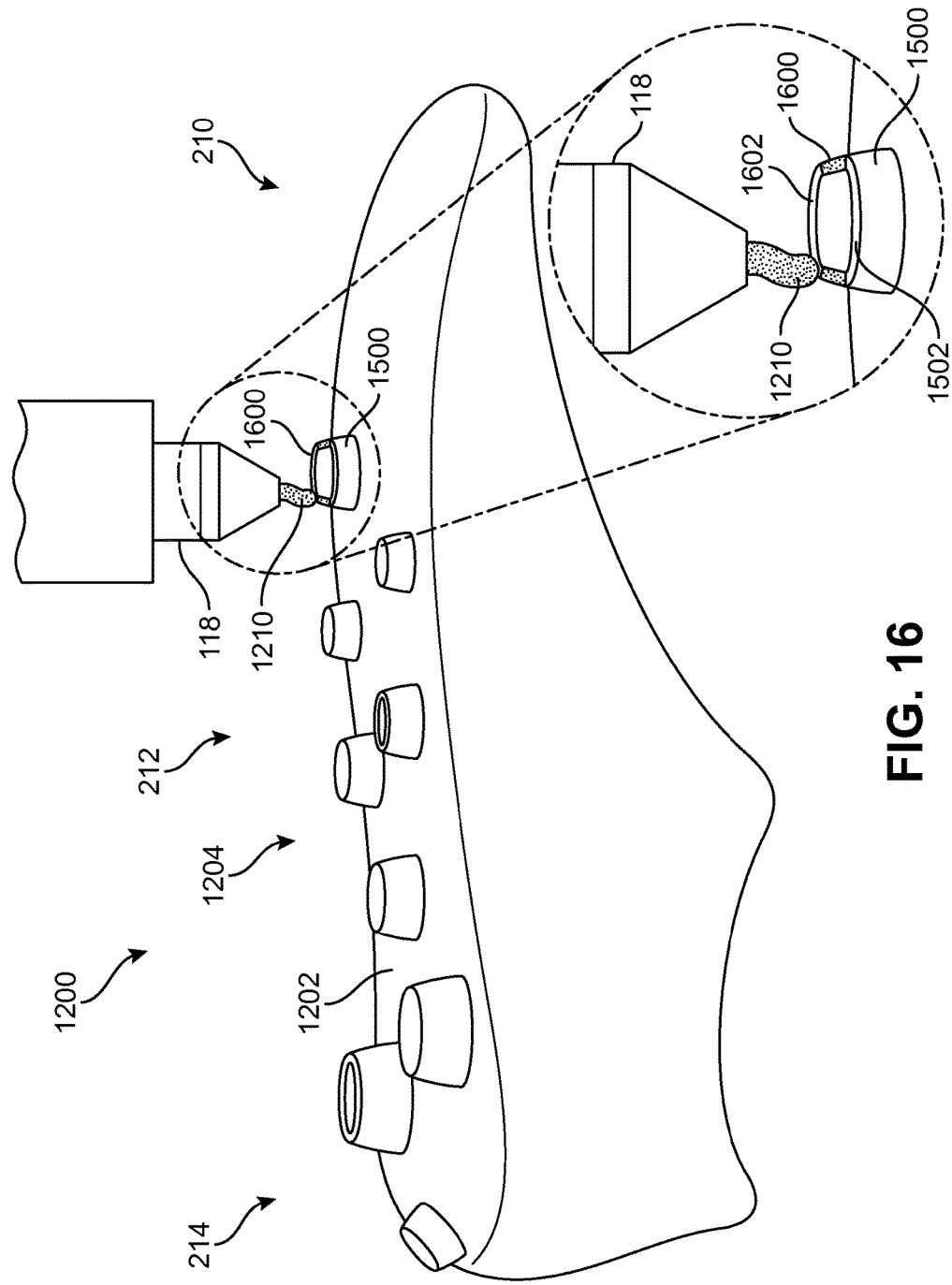
FIG. 16 is a schematic view of an embodiment of an article and a nozzle assembly.

FIG. 15 illustrates the completion of second segment 1400 printed on first segment 1300, forming a first composite segment 1500, including first segment 1300 and second segment 1400 (see FIGS. 13 and 14). First composite segment 1500 has an upper surface 1502. In FIG. 16, a first portion 1602 of a third segment 1600 (also comprising at least one printed layer) is being formed on upper surface 1502 of first composite segment 1500. It should be noted that while the printing of cleats 1204 is depicted as comprising discrete segments or portions, the formation of a segment may be printed in a continuous manner. For example, first segment 1300, second segment 1400, and/or third segment 1600 may be printed such that there is no discernible distinction between any segments.

Figure 17:
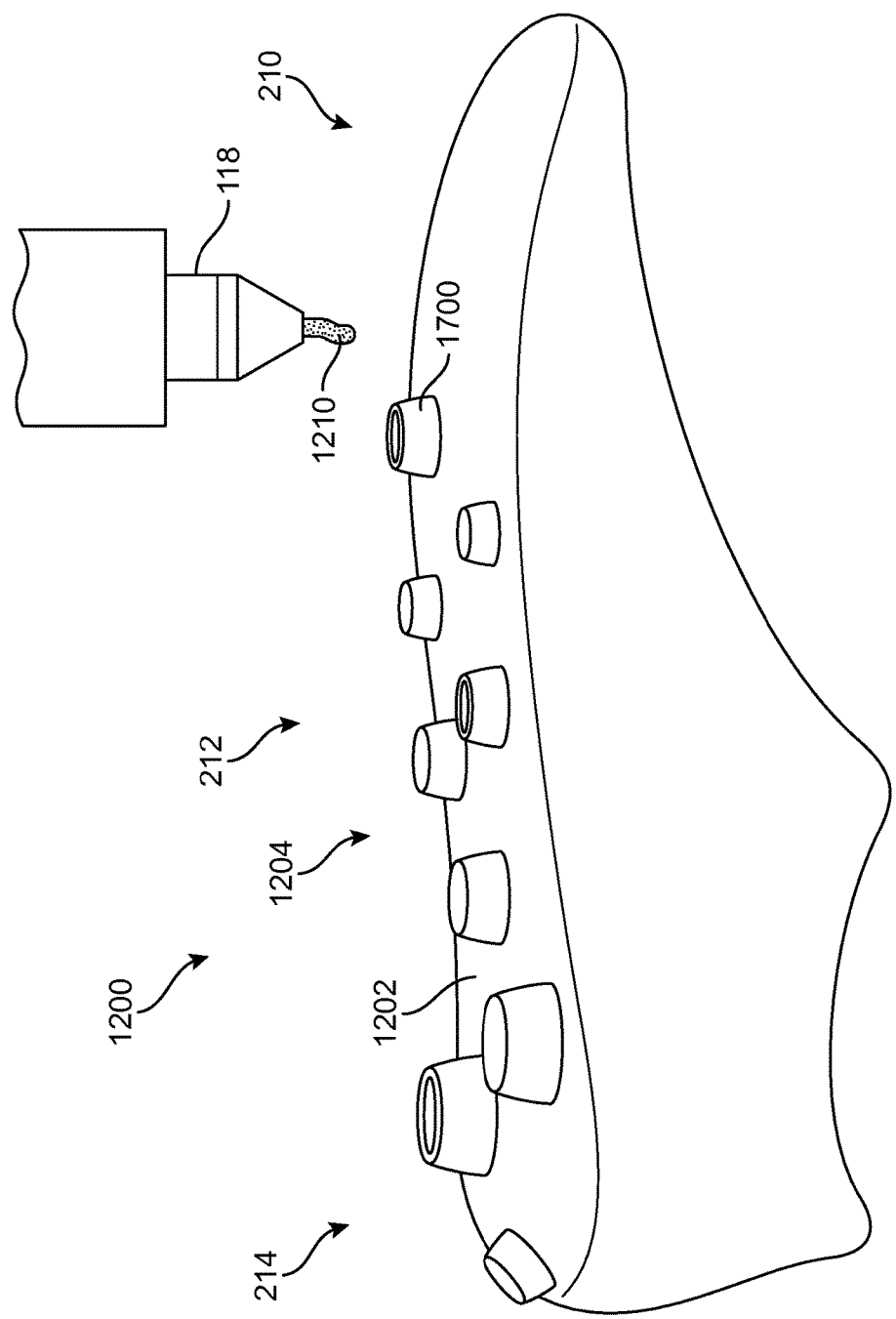
FIG. 17 is a schematic view of an embodiment of an article and a nozzle assembly.

In FIG. 17, a third cleat 1700 has been formed, including first segment 1300, second segment 1400, and third segment 1600. Upon completion of a three-dimensional structure along contoured print surface 148, nozzle 118 may move in any direction in order to detach printed material 1210 from third cleat 1700. For example, in FIG. 17, nozzle 118 has moved upward along the vertical axis and toward forefoot region 210 in a direction aligned with the longitudinal axis, and detached from third cleat 1700.

In other embodiments, printing system 100 may be used to form various patterns, designs, color forms, and other fabric work along a flat or curved surface. For example, in some embodiments, printing system 100 may be used to print decorative accents that provide an article with patterns similar to patterns made through embroidery. As is known to one with ordinary skill in the art, embroidery can be used to decorate fabric or other materials with a needle and thread or yarn. Embroidery may also incorporate other materials such as metal strips, pearls, beads, quills, and sequins in its patterns. For purposes of this description, the term "embroidered patterns" refers to any type of design, decorative art, fabrication, or other representation added to a material. "Embroidered patterns" have been traditionally formed through stitching or sewing. However, in different embodiments, printing system 100 may be used to provide, form, or attach embroidered patterns to a curved surface. Such an application of printing system 100 may allow the formation of embroidered-like designs without the need to pierce the surface of a fabric or textile, improve the efficiency of embroidered pattern formation, and allow embroidered patterns to be more readily formed on a variety of objects. In one embodiment, an embroidered pattern may be added to pre-manufactured or pre-fabricated three-dimensional articles 130.

Figure 18:
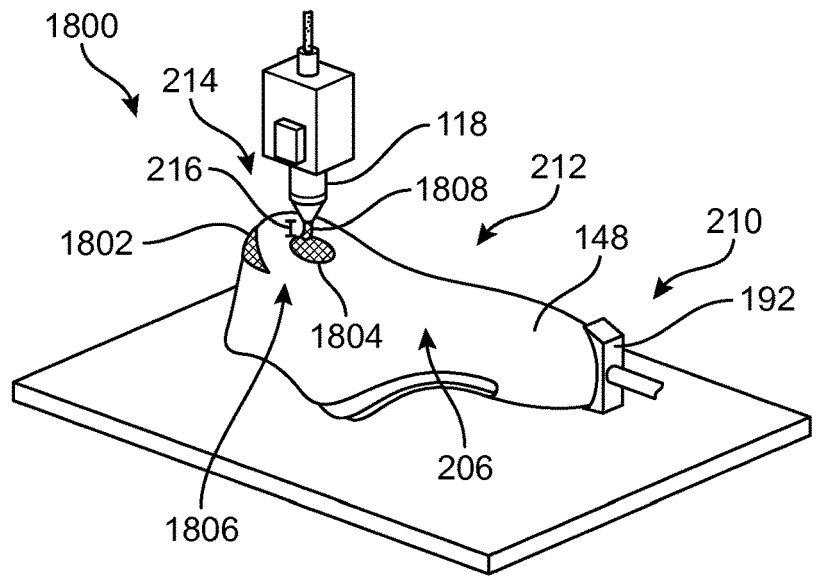
FIG. 18 is a schematic view of an embodiment of an article and a nozzle assembly.
Figure 19:
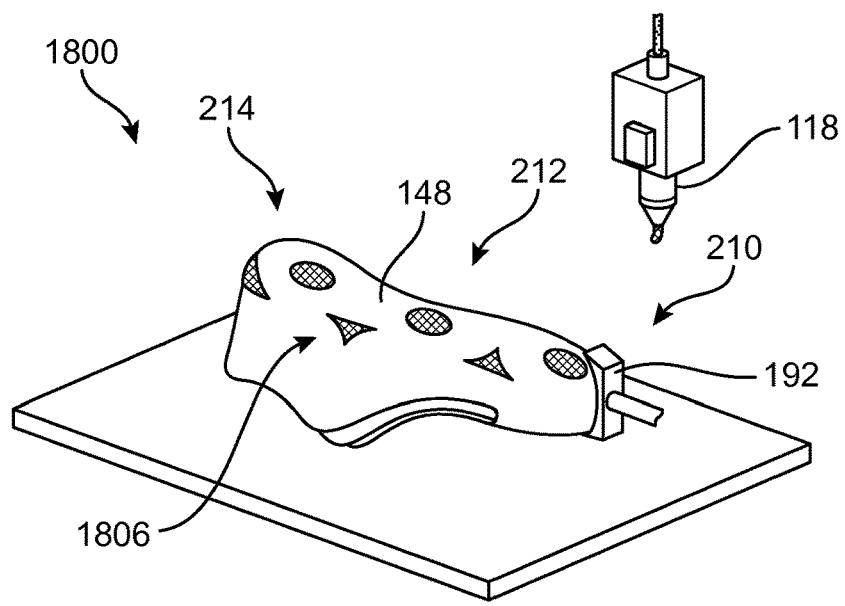
FIG. 19 is a schematic view of an embodiment of an article and a nozzle assembly.

For example, in FIGS. 18-19, nozzle 118 is shown as it prints along medial side 206 of a fourth article 1800, extruding a printed material 1808. In FIG. 18, printing system 100 moves nozzle 118 from a non-zero print distance 216 (as described with reference to FIGS. 1-17) into print surface 148, such that nozzle 118 directly contacts print surface 148, and print distance 216 becomes zero. Thus, as shown in FIG. 18, printing system 100 has moved nozzle 118 from print distance 216 into print surface 148, so that nozzle 118 is in direct contact with the attaching surface. In other embodiments, embroidered patterns 1806 may be formed while maintaining a non-zero print distance 216.

In some embodiments, embroidered patterns 1806 may be formed along various portions of fourth article 1800. For example, a first embroidered pattern 1802 has been formed along heel region 214 of fourth article 1800 along a curved area. In FIG. 19, a series of embroidered patterns 1806 including second embroidered pattern 1804 have been formed along forefoot region 210, midfoot region 212, and heel region 214 of the three-dimensional contours or curves of fourth article 1800. Printing of embroidered patterns 1806 may involve any of the features of printing system 100 described earlier, including first actuating system 114 and second actuating system 190.

While various embodiments have been described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. An apparatus for printing onto a curved surface of an article, the apparatus comprising:
    a housing, the housing including a base disposed along the bottom of the housing;
    a nozzle configured to discharge a composite yarn onto the curved surface;
    a first actuating system configured to move the nozzle, wherein the first actuating system moves the nozzle along a direction aligned with a vertical axis, the vertical axis extending normal to a surface of the base, and wherein the first actuating system moves the nozzle along a direction aligned with a first horizontal axis, the first horizontal axis being approximately parallel with respect to the base;
    the apparatus being configured to attach the composite yarn to the curved surface by moving the nozzle downward toward the curved surface in a direction aligned with the vertical axis;
    the apparatus being configured to attach the composite yarn to the curved surface by moving the nozzle in a direction aligned with the first horizontal axis; and
    a second actuating system configured to rotate the article, wherein the second actuating system rotates the article about a second horizontal axis, the second horizontal axis being approximately parallel with respect to the base.

2. The apparatus of claim 1, wherein the second actuating system is configured to adjust the position of the article with respect to the nozzle, wherein the second actuating system moves the article along a direction parallel to the vertical axis, and wherein the second actuating system moves the article along a direction parallel to the first horizontal axis;
    the apparatus being configured to facilitate the attachment of the composite yarn to the curved surface of the article by moving the article in a direction parallel to the vertical axis; and
    the apparatus being configured to facilitate the attachment of the composite yarn to the curved surface of the article by moving the article in a direction parallel to the first horizontal axis.

3. The apparatus of claim 1, wherein the article is an at least partially assembled upper for an article of footwear.

4. The apparatus of claim 1:
    wherein the first actuating system moves the nozzle in a direction aligned with a third horizontal axis, wherein the third horizontal axis is perpendicular to both the vertical axis and the first horizontal axis; and
    wherein the apparatus is configured to attach the composite yarn to the curved surface by moving the nozzle in a direction aligned with the third horizontal axis.

5. The apparatus of claim 1, further comprising an adjustable gripping member configured for attaching the article to the second actuation mechanism, wherein the second actuation mechanism is configured to rotate the adjustable gripping member about the second horizontal axis to cause rotation of the article about the second horizontal axis.

6. The apparatus of claim 5, wherein the adjustable gripping member is a clamp.

7. The apparatus of claim 5, wherein the adjustable gripping member is a claw.

8. The apparatus of claim 5, wherein the article is an at least partially assembled upper for an article of footwear, and wherein the adjustable gripping member is configured for receiving a forefoot region of the article of footwear.

9. The apparatus of claim 8, wherein the adjustable gripping member is rotatable between a first configuration and a second configuration, wherein in the first configuration, a medial side of the article of footwear is adjacent the nozzle, and wherein in the second configuration, a lateral side of the article of footwear is adjacent the nozzle.

10. The apparatus of claim 9, wherein the adjustable gripping member is rotatable between a third configuration and a fourth configuration, wherein in the third configuration, a bottom surface of the article of footwear is adjacent the nozzle, and wherein in the fourth configuration, an upper surface of the article of footwear is adjacent the nozzle.

11. An apparatus for printing onto a curved surface of an article, the apparatus comprising:
    a housing, the housing including a base disposed along the bottom of the housing;
    a nozzle configured to discharge a composite yarn onto the curved surface;
    a first actuating system configured to move the nozzle, wherein the first actuating system moves the nozzle along a direction aligned with a vertical axis, the vertical axis extending normal to a surface of the base, and wherein the first actuating system moves the nozzle along a direction aligned with a first horizontal axis, the first horizontal axis being approximately parallel with respect to the base;

the apparatus being configured to attach the composite yarn to the curved surface by moving the nozzle downward toward the curved surface in a direction aligned with the vertical axis;

the apparatus being configured to attach the composite yarn to the curved surface by moving the nozzle in a direction aligned with the first horizontal axis;

a second actuating system configured to adjust the position of the article with respect to the nozzle, wherein the second actuating system moves the article along a direction parallel to the vertical axis, and wherein the second actuating system moves the article along a direction parallel to the first horizontal axis;

the apparatus being configured to facilitate the attachment of the composite yarn to the curved surface of the article by moving the article in a direction parallel to the vertical axis; and the apparatus being configured to facilitate the attachment of the composite yarn to the curved surface of the article by moving the article in a direction parallel to the first horizontal axis.

12. The apparatus of claim 11, wherein the article is an at least partially assembled upper for an article of footwear.

13. The apparatus of claim 11:
wherein the first actuating system moves the nozzle in a direction aligned with a second horizontal axis, wherein the second horizontal axis is perpendicular to both the vertical axis and the first horizontal axis; and
wherein the apparatus is configured to attach the composite yarn to the curved surface by moving the nozzle in a direction aligned with the second horizontal axis.

14. The apparatus of claim 11, further comprising an adjustable gripping member configured for attaching the article to the second actuation mechanism, wherein the second actuation mechanism is configured to move the adjustable gripping member relative to the base and the nozzle.

15. The apparatus of claim 14, wherein the adjustable gripping member is a clamp.

16. The apparatus of claim 14, wherein the adjustable gripping member is a claw.

17. The apparatus of claim 14, wherein the article is an at least partially assembled upper for an article of footwear, and wherein the adjustable gripping member is configured for receiving a forefoot region of the article of footwear.

18. The apparatus of claim 11, wherein the second actuating system is configured to rotate the article, wherein the second actuating system rotates the article about a second horizontal axis, the second horizontal axis being approximately parallel with respect to the base.

19. The apparatus of claim 18, further comprising a securing device coupled to the article and the second actuating system, wherein the second actuating system is configured to rotate the securing device relative to the nozzle between a first configuration and a second configuration, wherein in the first configuration, a first side surface of the article is adjacent the nozzle, and wherein in the second configuration, a second side surface of the article is adjacent the nozzle.

20. The apparatus of claim 19, wherein the second actuating system is configured to rotate the securing device relative to the nozzle between a third configuration and a fourth configuration, wherein in the third configuration, a third side surface of the article is adjacent the nozzle, and wherein in the fourth configuration, a fourth side surface of the article is adjacent the nozzle.

21. An apparatus for printing onto a curved surface of an article, the apparatus comprising:
a housing, the housing including a base disposed along the bottom of the housing;
a nozzle configured to discharge a composite yarn onto the curved surface;
a first actuating system configured to move the nozzle, wherein the first actuating system moves the nozzle along a direction aligned with a vertical axis, the vertical axis extending normal to a surface of the base, and wherein the first actuating system moves the nozzle along a direction aligned with a first horizontal axis, the first horizontal axis being approximately parallel with respect to the base;
the apparatus being configured to attach the composite yarn to the curved surface by moving the nozzle downward toward the curved surface in a direction aligned with the vertical axis;
the apparatus being configured to attach the composite yarn to the curved surface by moving the nozzle in a direction aligned with the first horizontal axis; and
a second actuating system comprising an adjustable gripping member configured for rotating the article relative to the nozzle and the base.

* * * * *